United States Patent
Subramanian et al.

(10) Patent No.: US 12,196,770 B2
(45) Date of Patent: Jan. 14, 2025

(54) AUTOMATED SAMPLE DEPOSITION AND STAINING SYSTEMS AND ASSOCIATED METHODS

(71) Applicants: NanoCytomics, LLC, Evanston, IL (US); Northwestern University, Evanston, IL (US)

(72) Inventors: Hariharan Subramanian, Evanston, IL (US); Michael Verleye, Evanston, IL (US); Micah Litow, Evanston, IL (US); Justin R. Derbas, Evanston, IL (US); Sergey Rozhok, Evanston, IL (US); John Hart, Evanston, IL (US); Chester Henderson, Box Hill (AU); Rebecca Bartel, Box Hill (AU); Nathan Ray, Box Hill (AU); Anthony White, Box Hill (AU)

(73) Assignees: NanoCytomics, LLC, Evanston, IL (US); Northwestern University, Evanston, IL (US)

(*) Notice: Subject to any disclaimer, the term of this patent is extended or adjusted under 35 U.S.C. 154(b) by 0 days.

(21) Appl. No.: 18/333,828

(22) Filed: Jun. 13, 2023

(65) Prior Publication Data
US 2024/0133905 A1 Apr. 25, 2024
US 2024/0230689 A9 Jul. 11, 2024

Related U.S. Application Data

(63) Continuation of application No. 17/258,873, filed as application No. PCT/US2019/041150 on Jul. 10, 2019, now Pat. No. 11,719,712.
(Continued)

(51) Int. Cl.
*G01N 1/00* (2006.01)
*G01N 1/28* (2006.01)
(Continued)

(52) U.S. Cl.
CPC ..... *G01N 35/00029* (2013.01); *G01N 1/2813* (2013.01); *G01N 1/312* (2013.01);
(Continued)

(58) Field of Classification Search
None
See application file for complete search history.

(56) References Cited

U.S. PATENT DOCUMENTS

| 7,652,772 B2 | 1/2010 | Backman et al. |
| 7,667,832 B2 | 2/2010 | Backman et al. |

(Continued)

FOREIGN PATENT DOCUMENTS

| JP | 2014533823 | 12/2014 |
| JP | 2015/086534 | 1/2017 |

(Continued)

OTHER PUBLICATIONS

International Search Report and Written Opinion dated Jul. 12, 2022 for International Application No. PCT/US2022/022957, 11 pages.
(Continued)

*Primary Examiner* — Jyoti Nagpaul
(74) *Attorney, Agent, or Firm* — Perkins Coie LLP

(57) ABSTRACT

Cell deposition and staining apparatuses and methods are disclosed herein. In particular, the deposition and staining apparatuses disclosed herein provide low-volume, automated bench top systems for depositing and staining cellular samples on a cytological slide. An example deposition and staining apparatus includes a housing having an access door; a substrate processing holder located within the housing configured to hold one or more substrates and/or one or more substrate cartridges, wherein the substrate processing holder is accessible when the access door is in an open configuration; at least one opening located at least partially above at least a portion of the substrate processing holder; a spray
(Continued)

nozzle configured to dispense a gaseous substance into the substrate processing area; a user interface configured receive an input from a user, and in response to receiving the input, cause execution of a pre-programmed protocol; and a waste and/or reagent holder element.

15 Claims, 25 Drawing Sheets

Related U.S. Application Data

(60) Provisional application No. 62/696,119, filed on Jul. 10, 2018.

(51) Int. Cl.
    *G01N 1/31*     (2006.01)
    *G01N 35/00*     (2006.01)
    *G01N 35/10*     (2006.01)

(52) U.S. Cl.
    CPC ... *G01N 35/1002* (2013.01); *G01N 2001/317* (2013.01); *G01N 2035/00039* (2013.01)

(56) References Cited

U.S. PATENT DOCUMENTS

| | | |
|---|---|---|
| 7,800,746 B2 | 9/2010 | Backman et al. |
| 8,131,348 B2 | 3/2012 | Backman et al. |
| 8,735,075 B2 | 5/2014 | Backman et al. |
| 2006/0155178 A1 | 7/2006 | Backman et al. |
| 2011/0129655 A1 | 6/2011 | Botelho et al. |
| 2013/0065797 A1 | 3/2013 | Silbert et al. |
| 2014/0273071 A1 | 9/2014 | Ostgaard et al. |
| 2016/0250640 A1 | 9/2016 | Williams et al. |
| 2016/0291045 A1* | 10/2016 | Czarnecki ........ G01N 35/00029 |
| 2018/0127833 A1 | 5/2018 | Backman et al. |
| 2022/0276268 A1 | 9/2022 | Mendoza et al. |

FOREIGN PATENT DOCUMENTS

| | | |
|---|---|---|
| JP | 2018513984 | 5/2018 |
| WO | WO 2020/014323 | 1/2020 |

OTHER PUBLICATIONS

International Search Report and Written Opinion dated Sep. 26, 2019 for International Application No. PCT/US2019/041150.

* cited by examiner

AUTOMATED SAMPLE DEPOSITION AND STAINING SYSTEMS AND ASSOCIATED METHODS

CROSS-REFERENCE TO RELATED APPLICATION

This application is a continuation of U.S. patent application Ser. No. 17/258,873, filed Jan. 8, 2021, which is a 371 U.S. National Stage Application of International Patent Application No. PCT/US2019/041150 filed on Jul. 10, 2019, which claims priority to U.S. Provisional Patent Application Ser. No. 62/696,119, which was filed on Jul. 10, 2018, the entire contents of which are incorporated herein by reference and relied upon.

TECHNICAL FIELD

The present disclosure provides systems, apparatuses and associated methods to achieve spray deposition and staining of cellular samples within a single system. In particular, provided herein are automated systems capable of providing cellular sample deposition on microscopic slides and staining the cellular sample for analysis and for clinical, diagnostic, and research applications thereof.

BACKGROUND

In an effort to reduce re-biopsy rates among fine needle aspiration (FNA) biopsies, many large academic medical centers and hospitals have implemented rapid on-site evaluation (ROSE). ROSE has become a well-documented best practice and has a demonstrated ability to reduce re-biopsy rates by 50 to 70%. Unfortunately, due to the manual nature of ROSE, and the skill required to prepare and read the slides produced, only ~30% of institutions are able to perform ROSE. There are currently only approximately 3,000 cytopathologists and 6,000 cytotechnologists with the requisite skill necessary for performing ROSE. This shortage leaves many of the community hospitals and rural care settings without the personnel necessary to perform ROSE.

Histological or cytological analysis depends greatly on the quality of prepared specimens (e.g., cell samples). Inadequate preparation of specimens can result in inaccurate data that causes an error in interpretation of results and misdiagnosis. In addition, complicated, non-automated systems lead to backlogs, delayed diagnoses, unintended types of artifacts that are due to the complexity of procedures, and intolerable run-to-run variability. There remains a need to develop a simplified and reliable system for quick, accurate results using low-cost systems to reduce and/or eliminate these unintended artifacts and provide high-quality results.

SUMMARY

In some aspects provided herein are substrate cartridges comprising (a) a spray retainer; (b) a sample dispense port; and (c) an upper opening for receiving a spray nozzle. In some aspects provided herein are substrate cartridges comprising (a) a spray retainer; (b) a sample dispense port having (i) a first end of the sample dispense port for receiving a sample, (ii) a second end of the sample dispense port for releasing the sample into the spray retainer, and (iii) a sample retention zone located between the first end and the second end of the sample dispense port, wherein the second end of the sample dispense port is located at a side of the spray retainer; and (c) an upper opening for receiving a spray nozzle, wherein the upper opening is positioned at an angle to the second opening of the sample dispense port.

In some aspects provided herein are slide holders configured to hold at least one substrate cartridge according to an embodiment disclosed and described herein and at least one substrate.

In some aspects provided herein are kits comprising a slide holder according to an embodiment disclosed and described herein, at least one substrate cartridge according to an embodiment disclosed and described herein, and at least one substrate.

In some aspects provided herein are apparatuses for depositing and staining cellular samples comprising: (a) a housing having an access door; (b) a substrate processing holder located within the housing configured to hold one or more substrates and/or one or more substrate cartridges, wherein the substrate processing holder is accessible when the access door is in an open configuration; (c) at least one opening located at least partially above at least a portion of the substrate processing holder; (d) a spray nozzle configured to dispense a gaseous substance into the substrate processing area; (e) a user interface configured receive an input from a user, and in response to receiving the input, cause execution of a pre-programmed protocol; and (f) a waste and/or reagent holder element.

In some embodiments, the substrate cartridge has a bottom opening opposite to the upper opening, and wherein the spray retainer is disposed between the upper opening and the bottom opening.

In some embodiments, an area of the bottom opening is larger than an area of the upper opening.

In some embodiments, the substrate cartridge further comprises a sealing element disposed proximate to the bottom opening. In some embodiments, the sealing element includes a locking element, an o-ring, and/or a gasket.

In some embodiments, the substrate cartridge further comprises at least one reagent port. In some embodiments, the substrate cartridge further comprises at least one drain reservoir. In some embodiments, the substrate cartridge further comprises at least one waste extraction port. In some embodiments, the substrate cartridge further comprises a gripping element. In some embodiments, the substrate cartridge further comprises at least one alignment element that positions the substrate cartridge in a device and/or over a substrate.

In some embodiments, the spray retainer has a rectangular prismatic, cylindrical, or frusto-conical shape.

In some embodiments, at least one of the upper opening and/or the bottom opening is a rectangle, a circle, an oval. In some embodiments, a distance between the upper opening and the bottom opening is between about 1 cm and about 10 cm. In some embodiments, the upper opening is positioned at an angle between 75 degrees and 90 degrees with respect to the second end of the sample dispense port. In some embodiments, the sample dispense port is a detachable sample dispense port.

In some embodiments, the slide holder further comprises a handle.

In some embodiments, the substrate is a slide.

In some embodiments, the substrate cartridge and the substrate, when in contact, form a deposition/staining reservoir.

In some embodiments, at least a portion of the substrate cartridge protrudes at least partially from the at least one opening when the access door is in a closed position.

In some embodiments, the apparatus further comprises an environmental chamber. In some embodiments, the environmental chamber is configured to control humidity levels inside the apparatus.

In some embodiments, the apparatus further comprises at least one waste vessel and/or at least one reagent vessel in the waste and/or reagent holder element and in fluid communication with the substrate processing area.

In some embodiments, the apparatus further comprises a heating element.

In some embodiments, the spray nozzle dispenses the gaseous substance at a pressure of between about 1 psi and about 30 psi.

In some embodiments, the substrate processing holder is configured to receive a slide holder having at least one substrate cartridge and at least one substrate.

BRIEF DESCRIPTION OF THE DRAWINGS

Many aspects of the present disclosure can be better understood with reference to the following drawings. The components in the drawings are not necessarily to scale. Instead, emphasis is placed on illustrating clearly the principles of the present disclosure. Furthermore, components can be shown as transparent in certain views for clarity of illustration only and not to indicate that the illustrated component is necessarily transparent. For ease of reference, throughout this disclosure identical reference numbers may be used to identify identical or at least generally similar, analogous and/or complementary components or features.

DETAILED DESCRIPTION

Figure 1:
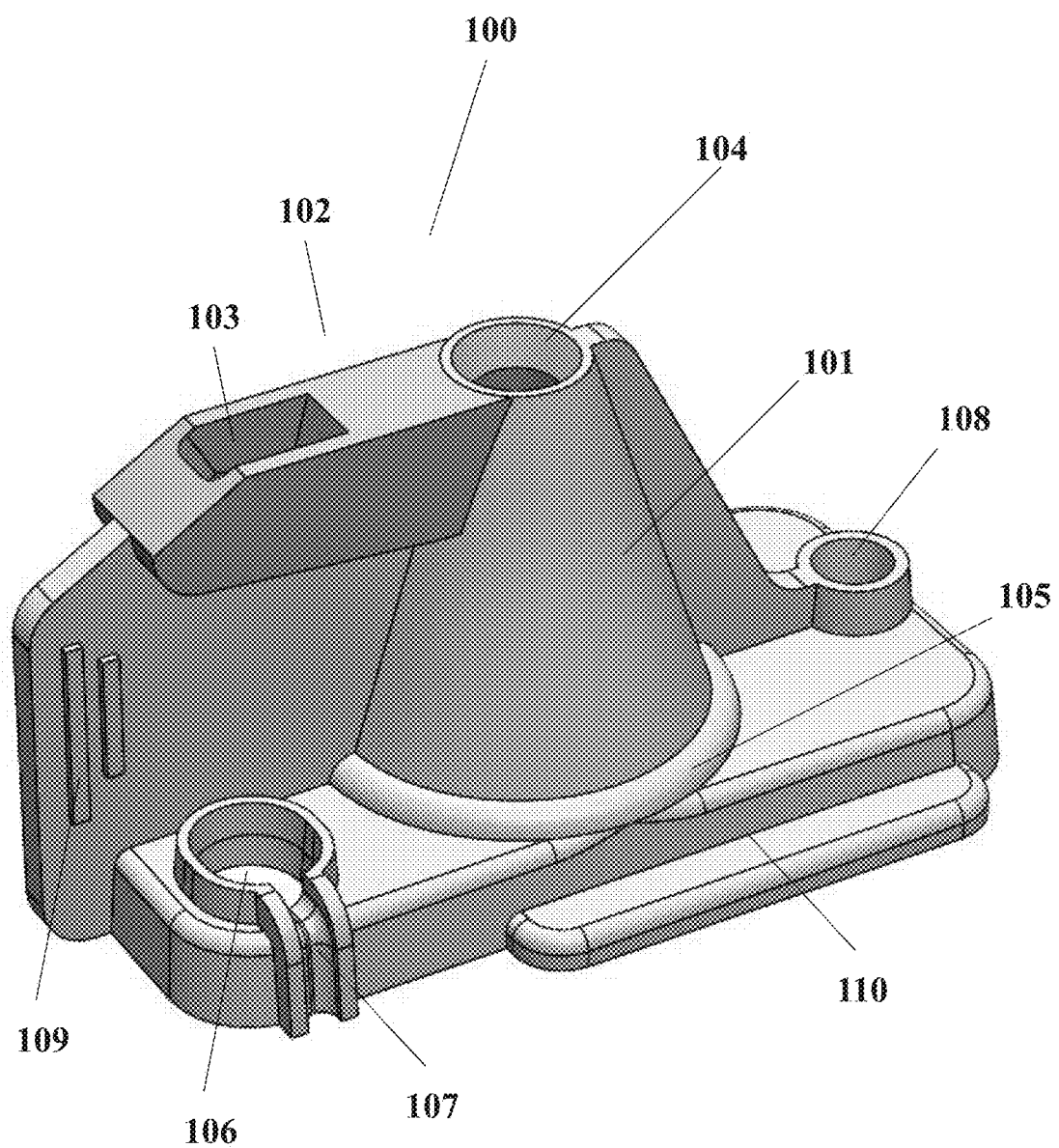
FIG. 1 is an isometric view schematically illustrating a substrate cartridge in accordance with an embodiment of the present disclosure.

The present disclosure is directed to apparatuses, systems, and methods for depositing and staining cellular material deposition and staining in one apparatus. For example, certain embodiments achieve spray deposition of cellular specimens on substrates and staining with various reagents for microscopy and other suitable molecular and imaging modalities of investigation. In particular, provided herein are substrate cartridges for directing cellular specimens onto a substrate as well as apparatuses for holding the substrate cartridges and running pre-programmed sample preparation modules (e.g., staining modules).

Specific details of several embodiments of the technology are described below with reference to FIGS. 1-25. Although many of the embodiments are described below with respect to devices, systems, and methods for generating high-quality specimen-bearing substrates, other applications and other embodiments in addition to those described herein are within the scope of the technology. Additionally, several other embodiments of the technology can have different configurations, components, or procedures than those described herein. A person of ordinary skill in the art, therefore, will accordingly understand that the technology can have other embodiments with additional elements, or the technology can have other embodiments without several of the features shown and described below with reference to FIGS. 1-25.

As used herein, the term "automated" refers to a method (e.g., "automated process") in which one or more steps are performed without the need for operator intervention, or to a system or apparatus (e.g., "automated instrument") that performs one or more of its functions without operator intervention.

As used herein, the term "fully automated" refers to a system, apparatus, or method that includes the capability of not requiring an operator for steps following initial set-up, yet is capable of maintaining the quality of the system performance over a time period unmonitored or unattended by an operator. In particular embodiments, an operator provides a sample to a system or apparatus and/or initiates acquisition, and samples and/or analysis is generated without subsequent operator intervention.

As used herein, the term "cellular sample" refers to any biological sample containing cells. Cellular samples can be a tissue sample or samples (e.g., any collection of cells) removed from a subject. The tissue sample can be a collection of interconnected cells that perform a similar function within an organism. A cellular sample can also be any solid or fluid sample obtained from, excreted by, or secreted by any living organism, including, without limitation, single-celled organisms, such as bacteria, yeast, protozoans, and amebae, multicellular organisms (such as plants or animals, including samples from a healthy or apparently healthy human subject or a human patient affected by a condition or disease to be diagnosed or investigated, such as cancer). In some embodiments, a cellular sample is mountable on a microscope slide and includes, without limitation, a section of tissue, an organ, a tumor section, a smear, a frozen section, a cytology prep, or cell lines. An incisional biopsy, a core biopsy, an excisional biopsy, a needle aspiration biopsy (e.g., fine needle aspiration (FNA)), a core needle biopsy, a stereotactic biopsy, an open biopsy, or a surgical biopsy can be used to obtain the sample.

Systems, devices and methods are provided herein for generating reproducible high-quality, stained cellular samples on substrates, such as microscope slides.

The present disclosure is also directed to substrate cartridges comprising: (a) a spray retainer; (b) a sample dispense port; and (c) an upper opening for receiving a spray nozzle. In some embodiments, the sample dispense port has at least one of (i) a first end of the sample dispense port for receiving a sample, (ii) a second end of the sample dispense port for releasing the sample into the spray retainer, and (iii) a sample retention zone located between the first end and the second end of the sample dispense port. In some embodiments, the second end of the sample dispense port is located at a side of the spray retainer. In some embodiments, the upper opening is positioned at an angle to the second opening of the sample dispense port.

The present disclosure is further directed to slide holders comprising (i) at least one substrate cartridge according to an embodiment disclosed and described herein and (i) at least one substrate.

Other aspects of the present disclosure are directed to apparatuses for depositing and staining cellular samples comprising at least one of: (a) a housing having an access door; (b) a substrate processing holder located within the housing configured to hold one or more substrates and/or one or more substrate cartridges; (c) at least one opening located at least partially above at least a portion of the substrate processing holder; (d) a nozzle configured to dispense a gaseous substance into the substrate processing area; (e) a user interface configured receive an input from a user, and in response to receiving the input, cause execution of a pre-programmed protocol; and (f) a waste and/or reagent holder element. In some embodiments, the substrate processing holder is accessible when the access door is in an open configuration.

The substrate cartridge of the present disclosure provides several functions. The cellular sample is loaded into the top of the substrate cartridge that has precise geometry to ensure the sample is retained until the spray is activated. The substrate cartridge also has features to contain the spray to prevent aerosolized sample being lost and seals against the substrate, using a flexible material or the geometry itself, to form a cavity (i.e., deposition and staining reservoir) to hold the reagent in contact with the substrate to allow the stain (i.e., reagents) to penetrate and stain the sample. The substrate cartridge is attached to the substrate, mechanically clamped down when the lid is closed, and then fluidic connections are made between the substrate cartridge, apparatus, reagent and waste lines. The substrate cartridge can be made of any suitable material. Non-limiting examples of suitable materials include bio-compatible plastic, for example, polycarbonate, polystyrene or polypropylene.

FIG. 1 is an isometric view schematically illustrating a substrate cartridge 100 for depositing and staining cellular samples onto a substrate in accordance with an embodiment of the present disclosure. The substrate cartridge 100 can include a spray retainer 101 that orients and directs the spray of a cellular sample. The substrate cartridge 100 can further comprise a sample dispense port 102 having a first end of the sample dispense port 103 for receiving a sample. The substrate cartridge 100 can further comprise an upper opening 104. The substrate cartridge can also comprise a bottom opening 105 located at least partially opposite to the upper opening 104, and wherein the spray retainer 101 is disposed between the upper opening 104 and the bottom opening 105.

In some embodiments, all or portions of the substrate cartridge 100 are disposable. Disposability of the substrate cartridge 100 can help prevent contamination between different samples. In some instances, disposable can refer to all or certain components of the substrate cartridge 100 being suitable for single-time use. In other embodiments, the substrate cartridge 100 can be reused or used more than once (e.g., following cleaning and/or sterilization). In certain instances, portions of the substrate cartridge 100 may not be disposable while other portions are disposable and/or need to be replaced. The substrate cartridge 100 can be made from a variety of materials such as plastics, metals, rubber, silicon, etc. The substrate cartridge 100 can further include, without limitation, one or more human-readable or machine-readable label.

Referring back to FIG. 1, the spray retainer 101 can be of any suitable shape and dimensions. In some embodiments, the spray retainer 101 slopes downwardly toward the surface of the substrate 204 and/or other drain reservoirs and has a shape from promoting radially diverging flow. Non-limiting shapes include rectangular prismatic, cylindrical, or frusto-conical. In some embodiments, the spray retainer 101 provides a protective chamber from containing the spray of cellular material during the spray deposition process.

The upper opening 104 and/or the bottom opening 105 can be of any suitable shape and dimension. In some embodiments, of the upper opening 104 and/or the bottom opening 105 can be a rectangle, a circle, or an oval. The area of the bottom opening 105 can be larger than an area of the upper opening 104. In some embodiments, the bottom opening 105 is about 1.25, about 1.5, about 1.75, about 2, about 2.25, about 2.5, about 2.75, about 3, about 3.25, about 3.5, about 3.75, about 4, about 4.25, about 4.5, about 4.75, about 5, about 5.25, about 5.5, about 5.75, about 6, about 6.25, about 6.5, about 6.75, about 7, about 7.25, about 7.5, about 7.75, about 8, about 8.25, about 8.5, about 8.75, about 9, about 9.25, about 9.5, about 9.75, about 10, or more times larger (e.g., in area) than the upper opening 104. The upper opening 104 and/or the bottom opening 105 can be of any suitable distance from one another. In some embodiments, the distance between the upper opening 104 and the bottom opening 105 is between about 0.1 cm and about 20 cm. In some embodiments, the distance between the upper opening 104 and the bottom opening 105 is about 0.1 cm, about 0.2 cm, about 0.3 cm, about 0.4 cm, about 0.5 cm, about 0.6 cm, about 0.7 cm, about 0.8 cm, about 0.9 cm, about 1 cm, about 2 cm, about 3 cm, about 4 cm, about 5 cm, about 6 cm, about 7 cm, about 8 cm, about 9 cm, about 10 cm, about 11 cm, about 12 cm, about 13 cm, about 14 cm, about 15 cm, about 16 cm, about 17 cm, about 18 cm, about 19 cm, or about 20 cm.

The substrate cartridge 100 can further comprise at least one reagent port 106, at least one drain reservoir 107, at least one waste extraction port 108, a gripping element 109, at least one alignment element 110, or any combination thereof. In some embodiments, the substrate cartridge 100 can comprise each of at least one reagent port 106, at least one drain reservoir 107, at least one waste extraction port 108, a gripping element 109, and at least one alignment element 110. The alignment element 110 positions the substrate cartridge in a device and/or over a substrate. The drain reservoir can be suitable to catch and/or retain overflow or overspray of cellular samples and/or regents during the deposition and/or staining process.

In some embodiments, the sample dispense port 102 is a detachable sample dispense port 102.

Figure 2:
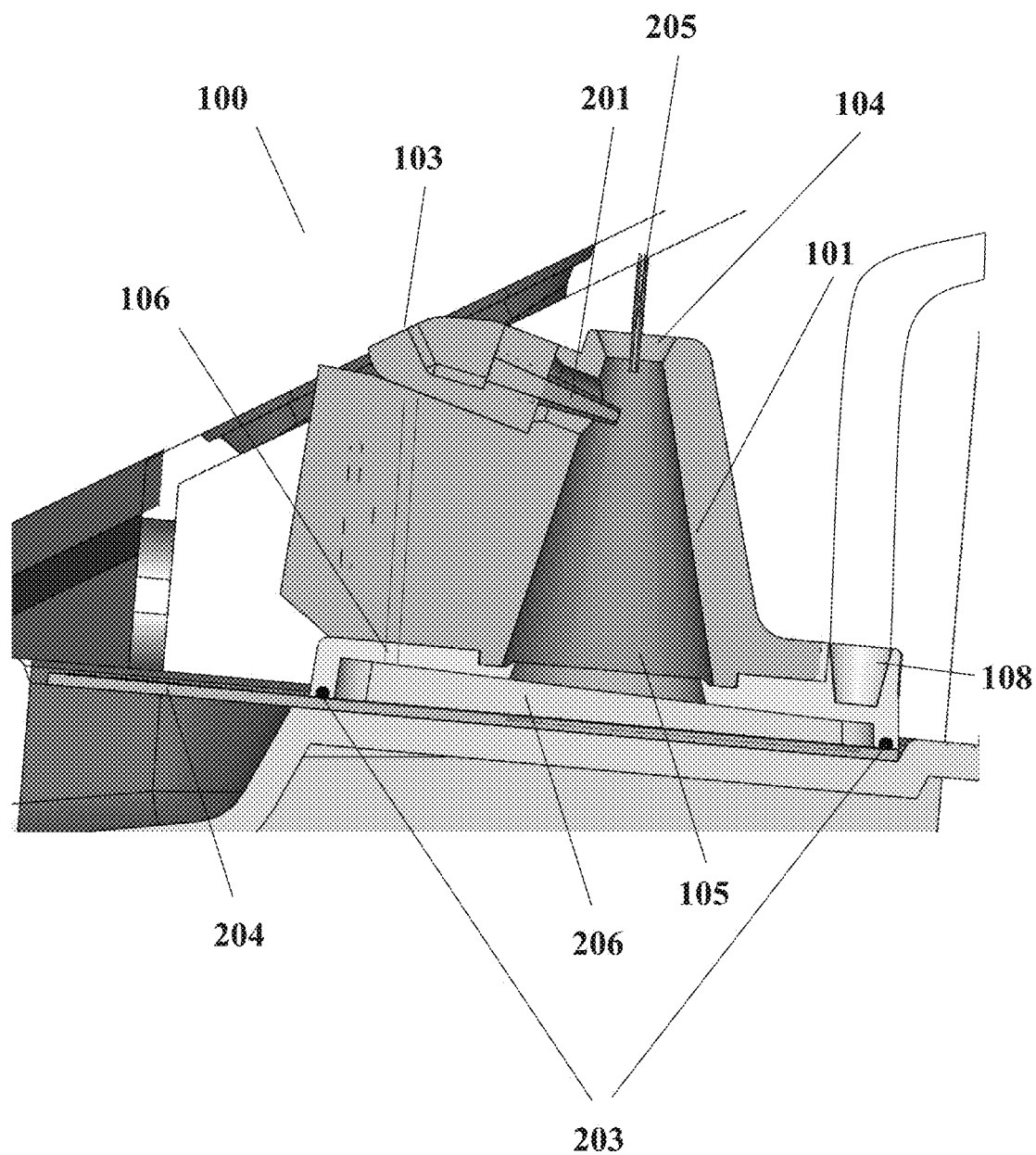
FIG. 2 is a perspective view of a substrate cartridge in accordance with an embodiment of the present disclosure.

FIG. 2 is a perspective view of a substrate cartridge 100 suitable for depositing cellular samples onto substrates in accordance with an embodiment of the present disclosure. The substrate cartridge 100 can include a sample retention zone 201 located between the first end of the sample dispense port 103 and the second end of the sample dispense port 202, wherein the second end of the sample dispense port 202 is located at a side of the spray retainer 101. The substrate cartridge 100 can further comprise an upper opening 104 for receiving a spray nozzle 205. In some embodiments, the spray nozzle 205 is aligned over a surface of a substrate 204.

The spray nozzle 205 can dispense any suitable gaseous substance including, for example, $CO_2$ or $O_2$. In some embodiments, the spray nozzle 205 dispenses the gaseous substance at a pressure of between about 1 psi and about 60 psi, between about 5 psi and about 40 psi, between about 10 psi and about 20 psi, about 1 psi, about 2 psi, about 3 psi, about 4 psi, about 5 psi, about 6 psi, about 7 psi, about 8 psi, about 9 psi, about 10 psi, about 15 psi, about 20 psi, about 25 psi, about 30 psi, about 35 psi, about 40 psi, about 45 psi, about 50 psi, about 55 psi, about 60 psi, or more. The spray nozzle 205 can be composed of multiple sub-components that serve to operate as one assembly. The spray nozzle 205 can comprise a gas port. The spray nozzle 205 may also have one or more filters to prevent contamination of the substrate. The geometry of the spray nozzle 205 may vary to limit material and to allow for fitting and decreased size.

In various arrangements, the spray deposition process can be optimized for each cellular sample. The spray deposition parameters (e.g., distance of spray nozzle from substrate, air pressure, air flow rate, nozzle design, per-spray volume, total volume, drying temperature, air drying time) can be a function of various sample properties, such as cell type, cell concentration, and transport or suspension liquid characteristics, such that:

distance, air pressure, air flow rate, nozzle design, per-spray volume, total volume, temperature drying, air drying]=f (cell type, concentration, liquid-type)

Cellular sample preparation and deposition can vary based on cellular characteristics such as shape, size, and sensitivity (e.g., fragility). Examples of parameters that can be varied based on cell type/specimen type can include:

1a. Distance between spray nozzle and substrate surface: the distance between the spray nozzle from the substrate can be varied for cells with different size and shape as the spray pattern can change at different distances. In certain embodiments, air pressure may need to be increased/decreased to accommodate the change in distance.

1b. Maximum gas/air pressure: the pressure at which cells are deposited can be varied to accommodate the size and shape of different cell types.

1c. Gas flow rate: the rate at which gas (compressed air) will flow can be optimized for each cell type. The size, shape and sensitivity of each cell type may be different and flow rates suitable for each cell type can be utilized/programed.

1d. Nozzle design: the cellular sample can be deposited on the substrate surface in a manner that yields a uniform layer of non-overlapping cells. In some embodiments, cell deposition can be designed to yield cells that are isolated (e.g., separated, non-touching) from other deposited cells on the surface of the substrate. Accordingly, the system can provide individual nozzle designs suitable to uniformly deposit specific sample types.

1e. Per spray volume: the per-spray volume deposited from each cellular sample can be controlled to accommodate the unique sizes and shapes of varying cell types. In some embodiments, the sample can be sprayed multiple times onto the surface of the substrate to yield the desired deposition yield.

1f. Total volume: the total volume of cellular material sprayed can also depend on determined cell type as both size and shape of each cell type vary.

1g. Temperature-based drying: sample drying (e.g., on the surface of the substrates) can be introduced and controlled to decrease sample preparation time. Evaporation can be enhanced by varying drying/heating mechanisms. In some embodiments incorporating multiple spray passes, the system can be configured to increase the temperature around the substrate to dry the sample on the surface of the substrate between each spray deposition process.

1h. Air drying: in some embodiments, the cellular sample can be air dried to decrease sample preparation time.

Cellular sample preparation and deposition can vary based on cell concentration. As discussed above, the apparatus can be provided with mechanisms and process steps for quantitatively assessing each sample prior to deposition. Examples of parameters that can be varied based on cell concentration can include:

2a. Distance between spray nozzle and substrate surface: the distance between the spray nozzle from the substrate can be varied for various cell concentrations. In certain embodiments, the distance can be adjusted to prevent overlap of cells deposed on the substrate surface.

2b. Maximum gas/air pressure: the pressure at which cells are deposited can be varied to accommodate cell concentration.

2c. Gas flow rate: the air flow rate will need to be adjusted for varying concentration.

2d. Nozzle Design: the cellular sample can be deposited on the substrate surface in a manner that yields a uniform layer of non-overlapping cells. In some embodiments, cell deposition can be designed to yield cells that are isolated (e.g., separated, non-touching) from other deposited cells on the surface of the substrate. Accordingly, the apparatus can provide individual nozzle designs suitable to uniformly deposit cells from samples having varying concentrations.

2e. Per-spray volume: the per-spray volume deposited from each cellular sample can be controlled to accommodate the varying cell concentrations. In some embodiments, the sample can be sprayed multiple times onto the surface of the substrate to yield the desired deposition yield.

2f. Total volume: the total volume of cellular material sprayed can be varied or spread out into multiple spray passes. For example, if the concentration of the sample is low, the total volume of the spray passes can be increased. Conversely, if the concentration is high, less volume can be deposited.

2g. Temperature-based drying: sample drying (e.g., on the surface of the substrates) can be introduced and controlled to decrease sample preparation time. Evaporation can be enhanced by varying drying/heating mechanisms. In some embodiments incorporating multiple spray passes, the system can be configured to increase the temperature around the substrate to dry the sample on the surface of the substrate between each spray deposition process (e.g., to prevent cell aggregation and/or movement on the substrate surface).

2h. Air drying: in some embodiments, the cellular sample can be air dried to decrease sample preparation time. In some embodiments, air drying the samples may be suitable for cells sensitive to environmental changes.

The spray deposition parameters described above, as well as other parameters (e.g., liquid temperature, biological sample temperature, etc.) can be pre-programmed such that a user of the apparatus can select and/or optimize the spray deposition program suitable for the type of cell or liquid in a particular cellular sample. In some embodiments, the apparatus 500 can screen the substrates 204 bearing cellular samples to determine if the spray deposition of the sample met the program criteria (e.g., sufficient cells were deposited, no overlapping cells etc.). Such screening methods may include screening the substrates by laser and/or by spectrographic techniques.

Referring back to FIG. 2, the substrate cartridge can also comprise a sealing element 203 disposed proximate to the bottom opening 105. As shown in FIG. 2, when a substrate (e.g., a slide) 204 is positioned with the substrate cartridge 100 a deposition/staining reservoir can be formed 206. The substrate cartridge 100 can enclose all or a portion of the substrate 204. For example, the substrate cartridge 100 can enclose at least the surface of the substrate 204 selected for specimen deposition (e.g., portion of a slide separate from a label portion).

The sealing element 203 can be of any suitable design. Non-limiting examples of suitable designs include a locking element, an o-ring, a gasket, snaps, clasps, friction, adhesive, and the like. In some embodiments, the sealing element 203 includes a locking element, an o-ring, and/or a gasket.

The upper opening 104 can be positioned at any suitable angle with respect to the second end of the sample dispense port 202. For example, the upper opening 104 can be positioned at an angle between about 25 degrees and about 100 degrees, between about 50 degrees and about 95 degrees, or between about 75 degrees and about 90 degrees with respect to the second end of the sample dispense port 202. In some embodiments, the upper opening 104 can be positioned at an angle between about 75 degrees and 90 degrees with respect to the second end of the sample dispense port 202.

Referring back to FIG. 2, the substrate cartridge can further comprise at least one reagent port 106, at least one waste port 108, or both.

Figure 3:
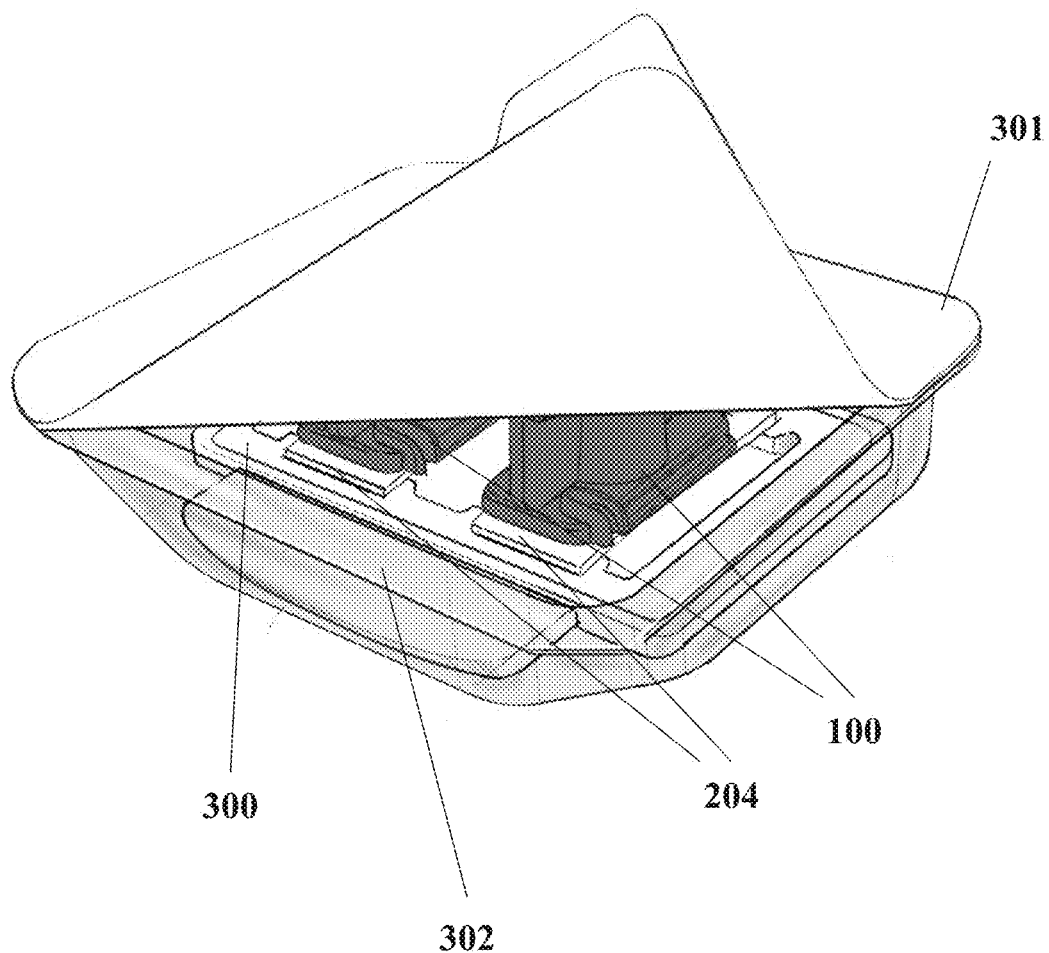
FIG. 3 is an isometric view illustrating packaging for a slide holder having two substrate cartridges and two substrates in accordance with an embodiment of the present disclosure.

FIG. 3 is an isometric view illustrating packaging 301 for a slide holder 300 having two substrate cartridges 101 and two substrates 204 in accordance with an embodiment of the present disclosure. The slide holder 300 can comprise one, two, three, four, five, six, or more substrate cartridges 101 and/or substrates 204. In some embodiments, the slide holder 300 comprises a handle 302 configured enable the slide holder to be transferred by a technician or robot. In some embodiments the handle 302 is configured to enable the technician or robot to transfer the slide holder containing at least one substrate cartridge 101 and at least one substrate 204 from an apparatus according to any of the embodiments disclosed and described herein and a second apparatus (e.g., a microscope). In some embodiments, the slide holder 300 is configured to fit into an apparatus according to any of the embodiments disclosed and described herein and a second apparatus (e.g., a microscope).

In some embodiments, the slide holder is packaged as a kit with at least one substrate cartridge and at least one substrate. In some embodiments, the slide holder, at least one substrate cartridge, and/or at least one substrate can be configured to be ready-to-use, as shown in FIG. 3. In some embodiments, the slide holder, at least one substrate cartridge, and/or at least one substrate can be packaged in any suitable packaging material. In other embodiments, the slide holder, at least one substrate cartridge, and at least one substrate can be packaged in one package or in multiple and/or separate, individual packages.

Figure 4:
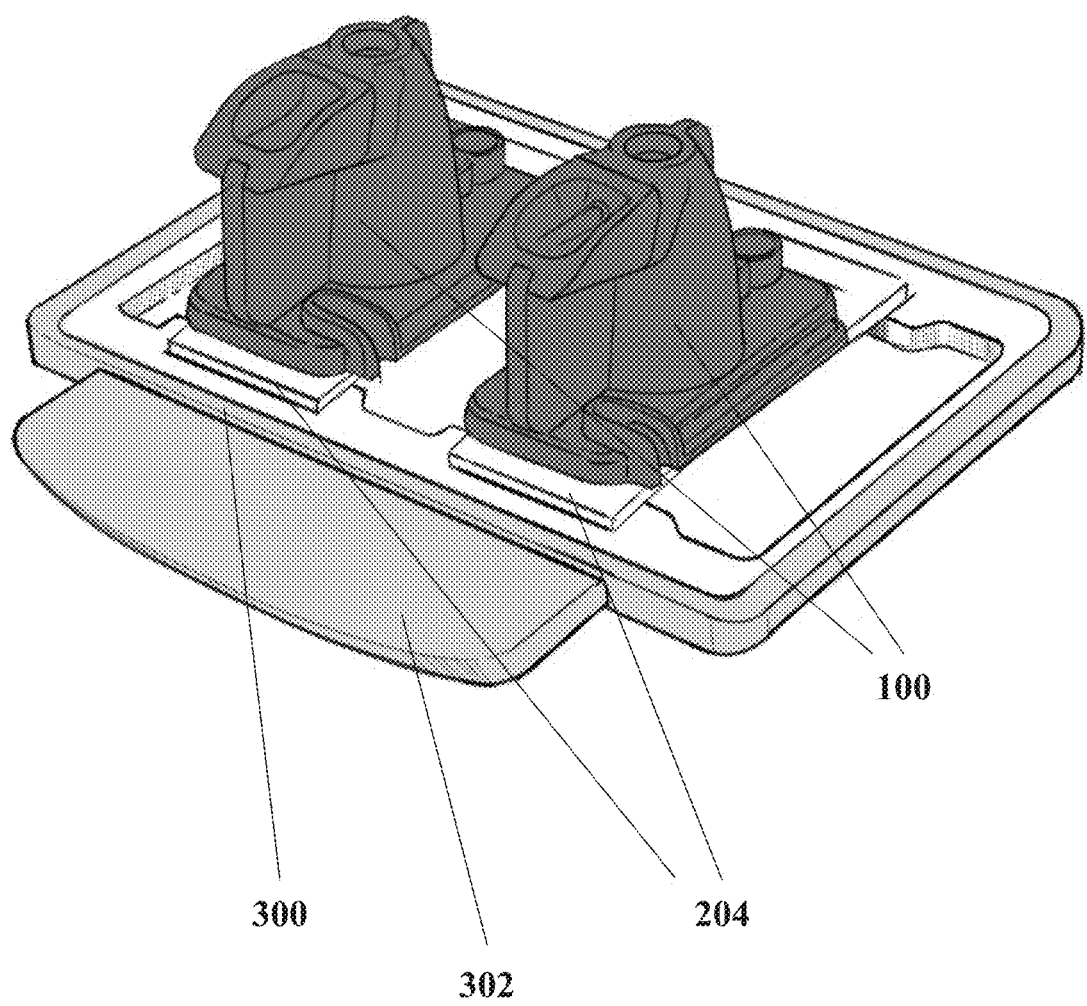
FIG. 4 is an isometric view illustrating a slide holder having two substrate cartridges and two substrates in accordance with an embodiment of the present disclosure.

FIG. 4 is an isometric view illustrating a slide holder 300 having two substrate cartridges 101 and two substrates 204 in accordance with an embodiment of the present disclosure. In some embodiments, the slide holder 300 comprises a handle 302 configured enable the slide holder to be transferred by a technician or robot.

Figure 5:
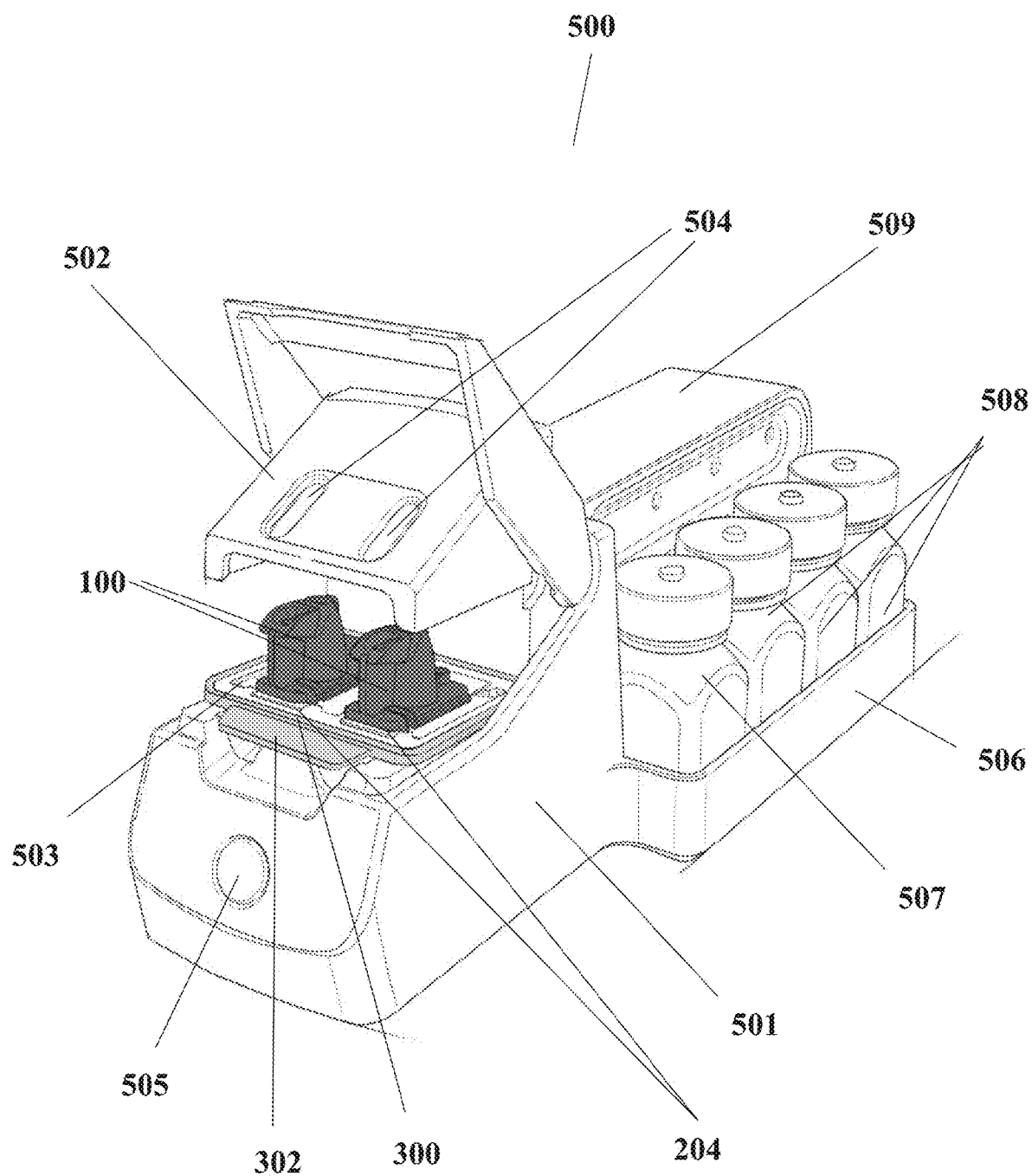
FIG. 5 is an isometric view illustrating a slide holder having two substrate cartridges and two substrates positioned within a cellular deposition and staining apparatus in accordance with an embodiment of the present disclosure.

FIG. 5 is an isometric view schematically illustrating a slide holder 300 having two substrate cartridges 101 and two substrates 204 positioned within a cellular deposition and staining apparatus 500 in accordance with an embodiment of the present disclosure. The slide holder 300 further comprises a handle 302. The apparatus for depositing and staining cellular samples can comprise: a housing 501 having an access door 502; a substrate processing holder 503 located within the housing 501 and configured to hold one or more substrates 204 and/or one or more substrate cartridges 101, wherein the substrate processing holder 503 is accessible when the access door 502 is in an open configuration; at least one opening 504 located at least partially above at least a portion of the substrate processing holder 503; a user interface 505 configured receive an input from a user, and in response to receiving the input, cause execution of a pre-programmed protocol; and a waste and/or reagent holder element 506.

In various embodiments, the housing 501 inhibits, limits, or substantially prevents contaminants from entering the substrate processing holder 503. The housing 501 can include an access door 502 (e.g., side swing door, up swinging door, slide panel, etc.) to allow access to the substrate processing holder 503. In various embodiments the housing 501 can also include a access panel 509 (e.g., side swing door, up swinging door, slide panel, etc.) to allow access to the internal components, including, without limitation, robotic components (e.g., robotic arms), transport devices (e.g., conveyors, actuators, etc.), fluidic components, specimen deposition stations, substrate platforms, mixing components (e.g., vibrating or vortexing components), pressurization devices (e.g., air compressors and fluid lines, pumps, vacuums, etc.), dryers, controller and power systems, etc. The housing 501 may also inhibit, limit, or substantially prevent residual spray from contaminating an external environment surrounding the housing 501.

In some embodiments, the apparatus 500 can further comprise a substrate and a substrate cartridge, wherein the substrate cartridge 100 and the substrate 204, when in contact, form a deposition/staining reservoir 206.

In some embodiments, at least a portion of the substrate cartridge 100 protrudes at least partially from the at least one opening 504 when the access door 502 is in a closed position. In some embodiments the apparatus 500 can further comprise an environmental chamber. The environmental chamber can be configured to control humidity levels inside the apparatus 500, in particular, in the substrate processing holder 503 and/or deposition/staining reservoir 206.

Referring back to FIG. 5, the apparatus 500 can further comprise at least one waste vessel 507 and/or at least one reagent vessel 508 in the waste and/or reagent holder element 506. The in at least one waste vessel 507 and/or at least one reagent vessel 508 can be in fluid communication with the substrate processing holder 503 and/or deposition/staining reservoir 206.

In some embodiments, software, code, or other executable instructions are provided to direct and/or control (e.g., along with a controller or processor) automated cellular sample deposition and/or sample staining by the system 500. In some embodiments, automation and/or high-throughput software is incorporated into the system 500, and provides one or more of: cellular sample intake, spray deposition, sample switching, substrate indexing, other sample-bearing substrate processing, staining, washing, etc.

Figure 6:
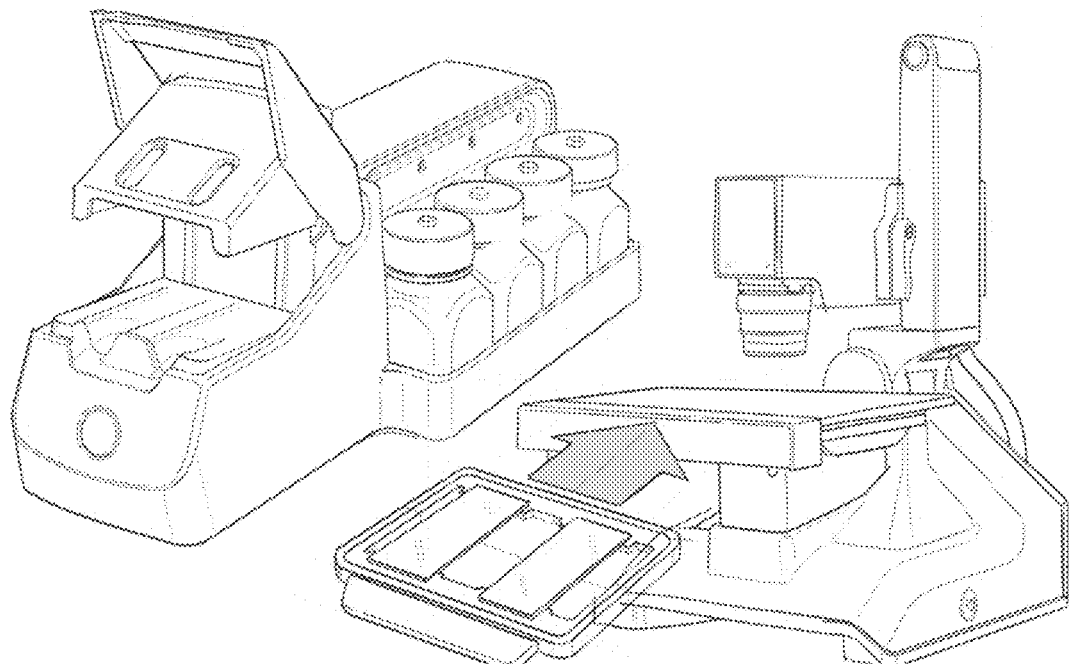
FIG. 6 is a schematic showing a slide holder having two substrates being positioned onto a microscope for visualization after cell deposition and staining using a cellular deposition and staining apparatus in accordance with an embodiment of the present disclosure.
Figure 7:
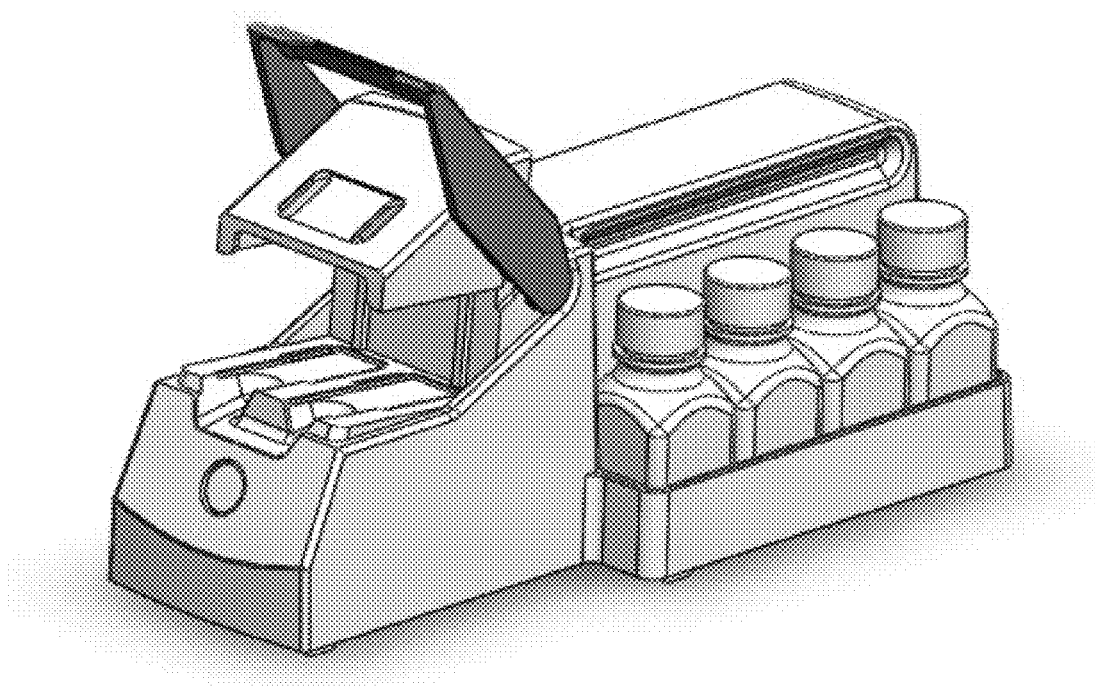
FIG. 7 is an isometric view illustrating a cellular deposition and staining apparatus in an open position for receiving a substrate and/or substrate cartridge in accordance with an embodiment of the present disclosure. The apparatus is a self-contained instrument, consisting of a sample spray deposition system, substrate staining and on-board waste to prepare and stain a substrate for pathological assessment. The system has a small footprint.
Figure 8:
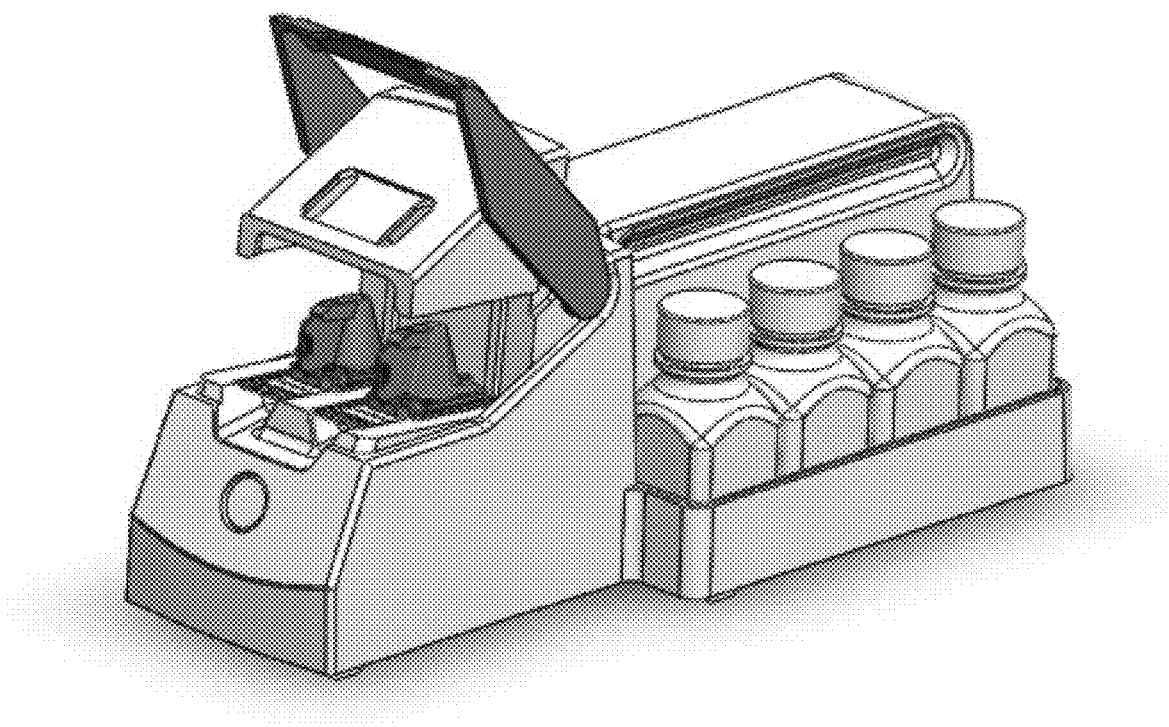
FIG. 8 is an isometric view illustrating a cellular deposition and staining apparatus in an open position and holding two substrates and two substrate cartridges in accordance with an embodiment of the present disclosure. The apparatus shown can prepare prepares two substrates (e.g., cytological slides) at a time, utilizing a single use substrate cartridge (e.g., consumable) that seals to the substrate to contain the spray and stain. The substrate and substrate cartridge connect together and then are loaded in the front of the unit. The cellular sample is then loaded into the substrate cartridge and the sub assembly is then clamped in place by closing the front cover.

FIG. 6 is a schematic showing a slide holder 300 having two substrates 204 being positioned onto a microscope for visualization after cell deposition and staining using a cellular deposition and staining apparatus 500 in accordance with an embodiment of the present disclosure. FIG. 7 is an isometric view illustrating a cellular deposition and staining apparatus 500 in an open position for receiving a substrate 204 and/or substrate cartridge 101 in accordance with an embodiment of the present disclosure. FIG. 8 is an isometric view illustrating a cellular deposition and staining apparatus 500 in an open position having a substrate 204 and/or substrate cartridge 101 in accordance with an embodiment of the present disclosure.

Figure 9:
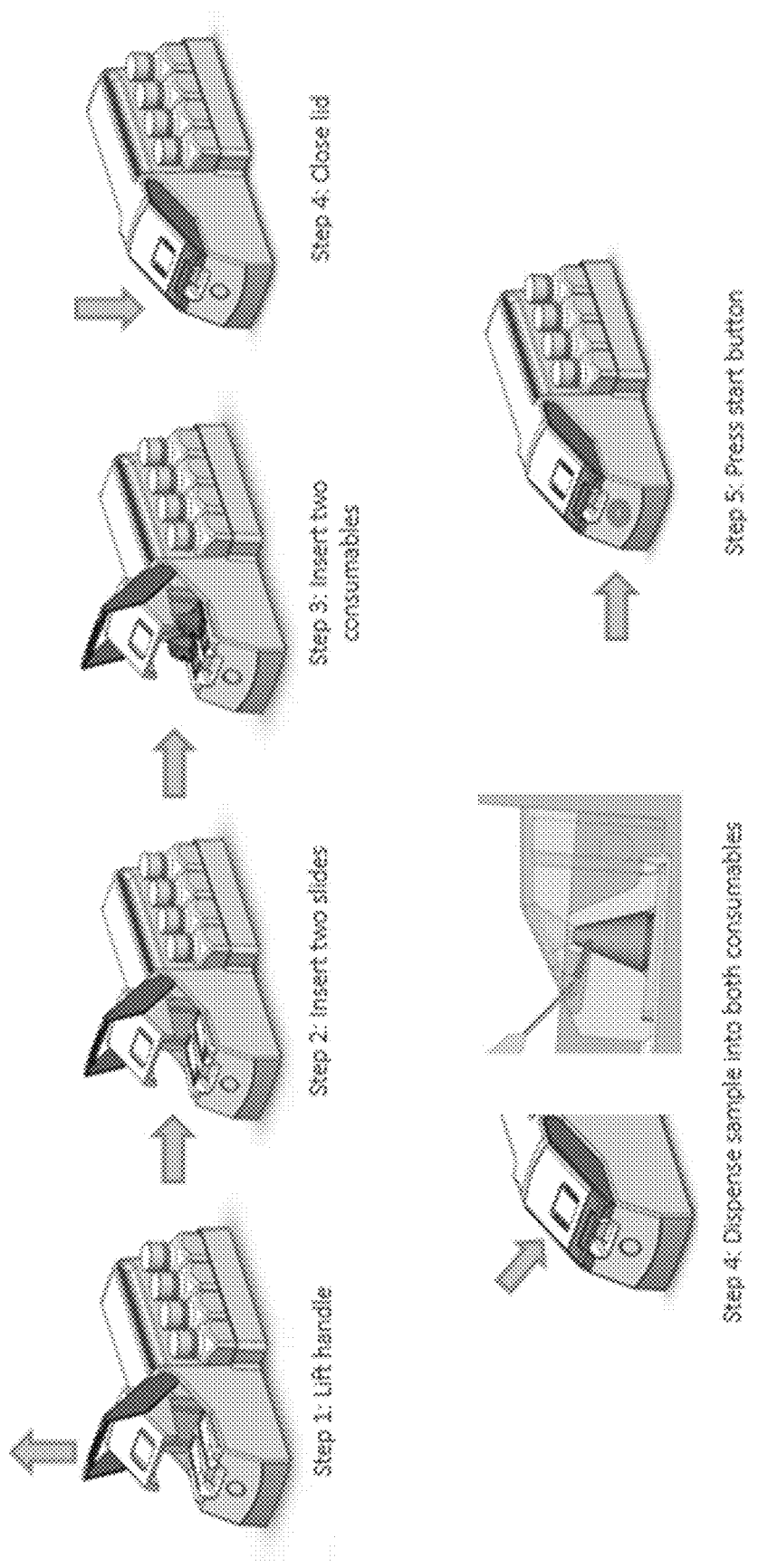
FIG. 9 is a schematic diagram for operating a cellular deposition and staining apparatus in accordance with an embodiment of the present disclosure.

FIG. 9 is a schematic diagram for operating a cellular deposition and staining apparatus 500 in accordance with an embodiment of the present disclosure.

After a user deposits a sample into the substrate cartridge 100, a programmed module can be initiated to, for example, deposit the cellular sample and/or provide reagents to the deposited cellular sample. FIGS. 10-18 are schematic representations of a program executed by the apparatus 500.

Figure 10:
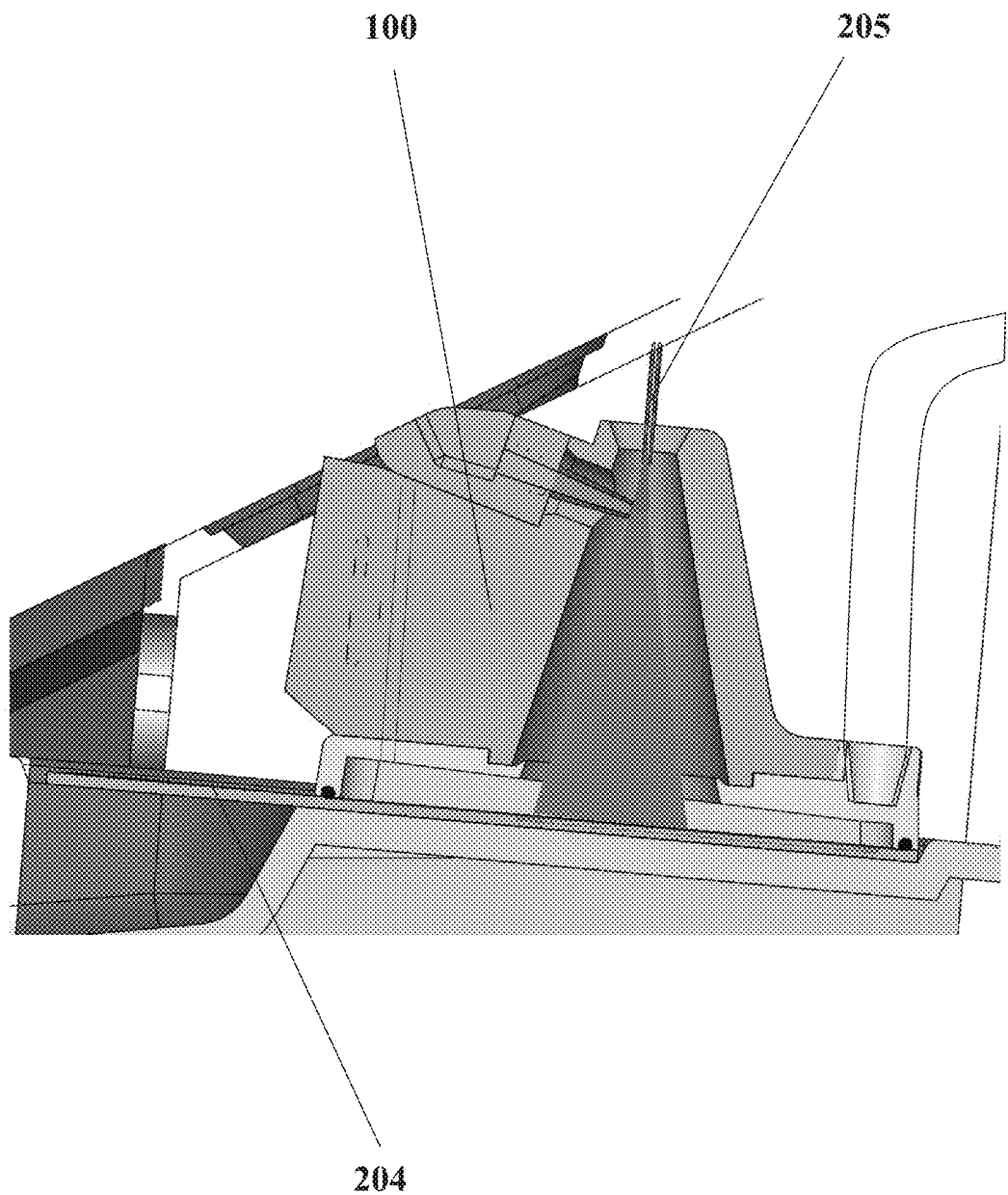
FIG. 10 is a perspective view of a substrate cartridge demonstrating sample deposition onto a substrate in accordance with an embodiment of the present disclosure.

FIG. 10 shows a substrate cartridge 100 demonstrating cellular sample deposition onto a substrate 204 with a controlled spray from the spray nozzle 205 in accordance with an embodiment of the present disclosure. In some embodiments, the system contains a controlled spray system that directs air over a portion of the sample dispense port 102, in particular the second end of the sample dispense port 202 to pull the sample into the air flow path and spray the cells onto the substrate 204. In some embodiments, the system comprises a $CO_2$ canister to provide a self-contained pressurized air source on board. The air is regulated to a known pressure (e.g., about 100 to about 300 kPa) and sprayed using a timed dispense (e.g., about 0.2 to about 1 sec) to provide a known volume of sample onto the substrate. In some embodiments, the sample is introduced at an angle to the spray nozzle of between about 10 to about 90 degrees. In some embodiments, at least a portion of the second end of the sample dispense port 202 has an orifice dimension of between about 0.4 to about 1.2 mm.

In some embodiments, the spray nozzle converts liquid samples into an aerosol that is then transferred onto a substrate. The liquid thin-film can dry within seconds and leaves a uniform monolayer of high quality cells. The deposition technique is highly adaptable and can deposit numerous cell samples. Non-limiting examples of suitable cell samples include cell cultures, human epithelial cells (e.g., squamous and columnar cells) and fine-needle aspirates.

Figure 11:
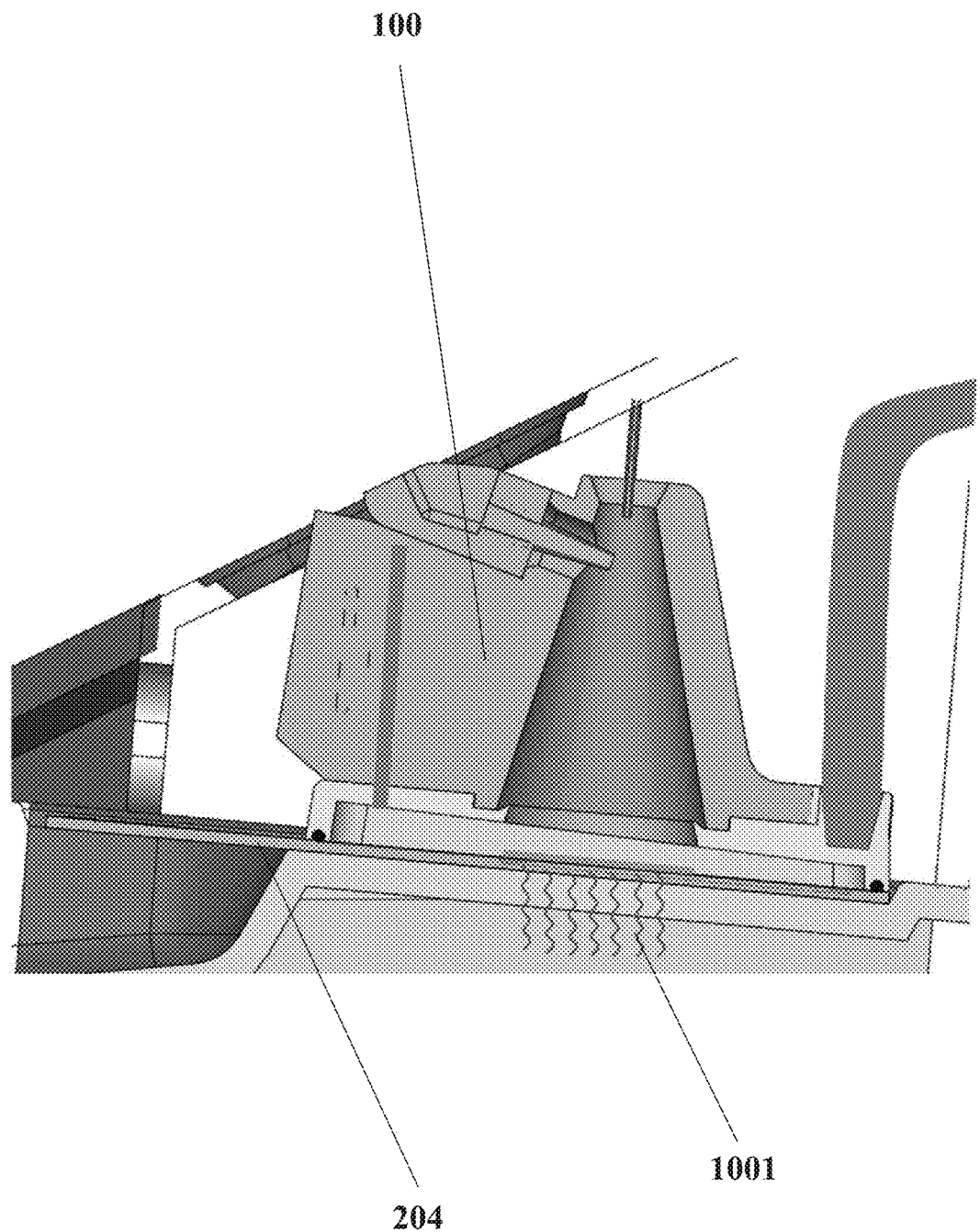
FIG. 11 is a perspective view of a substrate cartridge demonstrating sample heating in accordance with an embodiment of the present disclosure.

FIG. 11 shows a substrate cartridge 100 demonstrating treatment (e.g., drying) of the deposited sample on the substrate 204 by applying heat to the substrate 204 using a heating element 1001. Although the figures show heating only in FIG. 11, it would be understood by one of skill in the art that the heating step could be carried out at multiple steps of the module. For example, the sample could be heated, for example, right after the cells are in contact with the substrate 204, after a fixation step, after a wash step, or after a staining step. In some embodiments, the substrate 204 sits on a heated surface 1001 which provides controlled heat to the slide via a peltier or similar to provide accelerated drying of the sample on the substrate 204. The temperature can be controlled from about 0 to about 75 degrees. In some embodiments, the temperature can be controlled to be activated when needed.

The apparatus 500 can provide any mechanism for reducing the drying time of deposited cellular sample and/or reagent (e.g., stain or wash reagents) and known to one of skill in the art including, but not limited to, heating of surrounding air, heating of the substrate 204, laminar flow of dry air over a wet substrate, etc. In additional embodiments, the apparatus 500 can include sensors (e.g. optical) to monitor the drying of the wet substrate 204. Other embodiments can also include means to increase the quantity of cellular and/or tissue material on a substrate 204 through iterative deposition cycles with drying cycles between each deposition cycle. Such drying cycles can be performed with or without the various drying mechanisms discussed herein.

Figure 12:
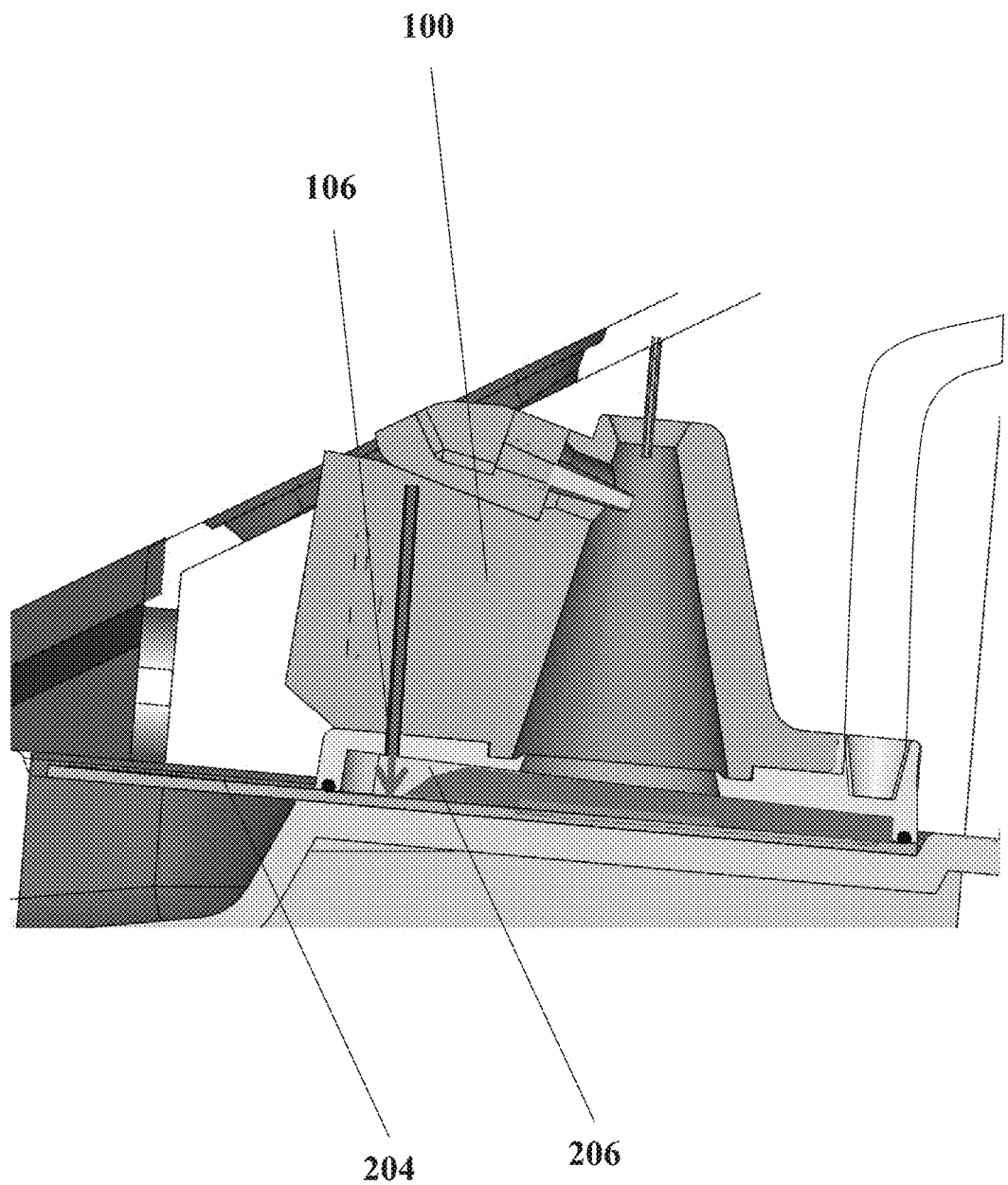
FIG. 12 is a perspective view of a substrate cartridge demonstrating sample fixation with a reagent in accordance with an embodiment of the present disclosure.
Figure 13:
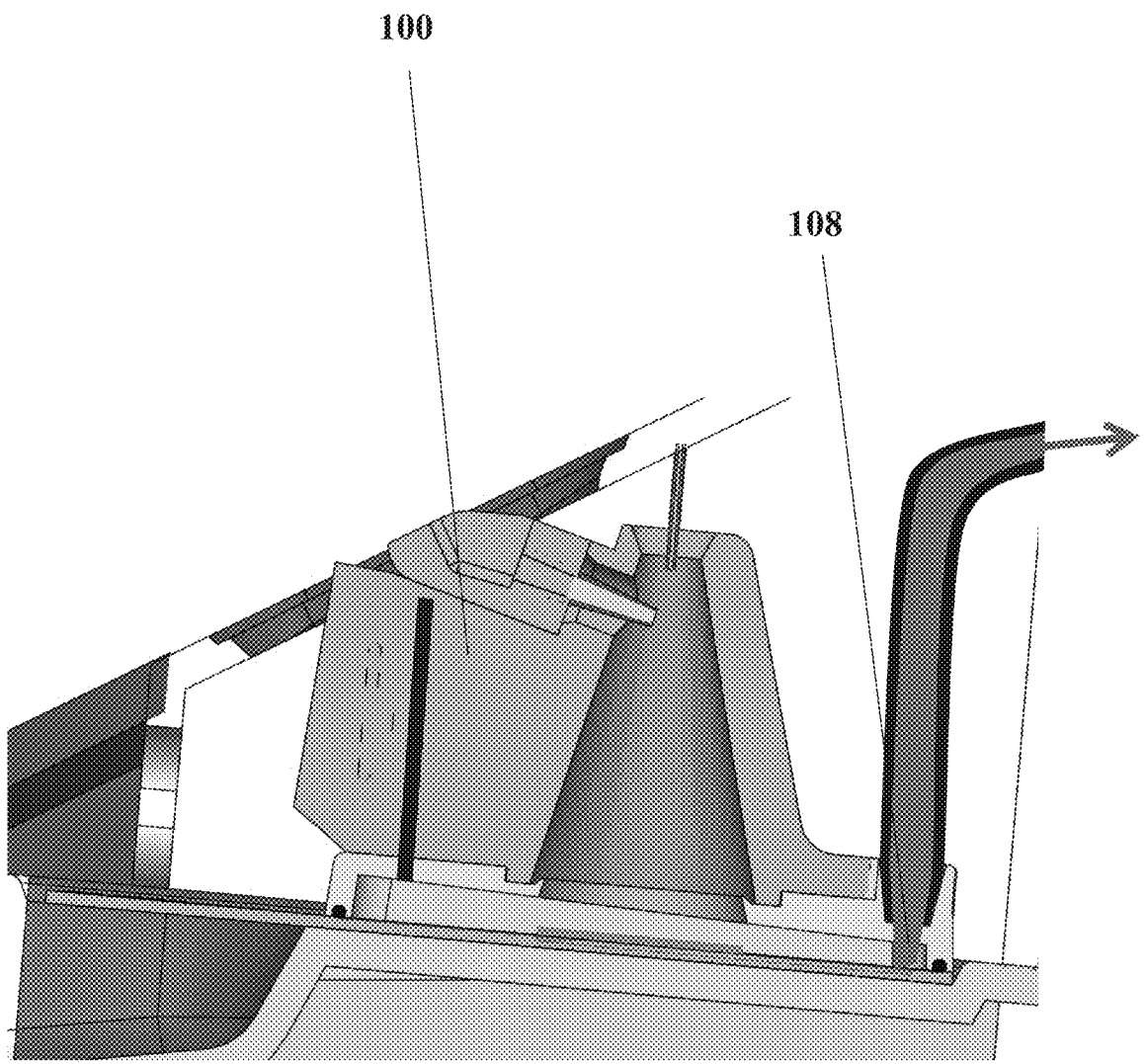
FIG. 13 is a perspective view of a substrate cartridge demonstrating waste removal in accordance with an embodiment of the present disclosure.
Figure 14:
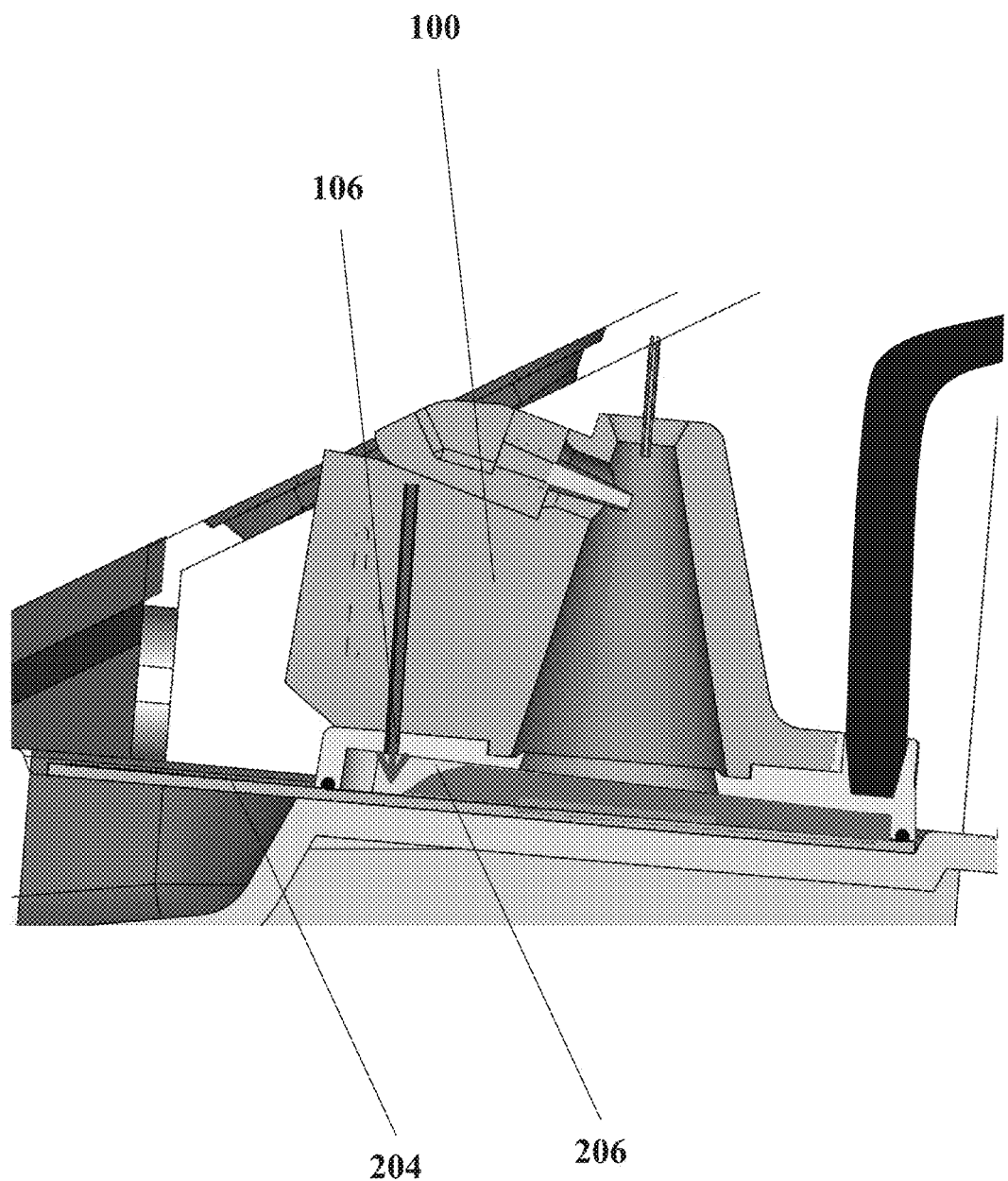
FIG. 14 is a perspective view of a substrate cartridge demonstrating sample staining with a reagent in accordance with an embodiment of the present disclosure.

Referring now to FIG. 12 a perspective view of a substrate cartridge 100 shows a fixative reagent being dispensed through a reagent port 106 and into the staining and deposition reservoir 206 created by the substrate cartridge 100 and substrate 204 in accordance with an embodiment of the present disclosure. The fixative covers, or at least partially covers, the cellular sample. In some embodiments, a delay in the programmed module at this step allows the fixative to remain on the cellular sample for a pre-determined amount of time to allow the fixative to penetrate the cellular sample. FIG. 13 is a perspective view of a substrate cartridge 100 showing removal of waste (e.g., used fixative) through the waste port 108 of the substrate cartridge 100 in accordance with an embodiment of the present disclosure. FIG. 14 is a perspective view of a substrate cartridge 100 showing a reagent (e.g., a first reagent) being dispensed through a reagent port 106 and into the staining and deposition reservoir 206 created by the substrate cartridge 100 and substrate 204 in accordance with an embodiment of the present disclosure. The reagent is dispensed and covers, or at least partially covers, the cellular sample. In some embodiments, a delay in the programmed module at this step allows the reagent to remain on the cellular sample for a pre-determined amount of time to allow the reagent to penetrate the cellular sample.

In some embodiments, a stain module uses the substrate cartridge 100 to create a staining and deposition reservoir 206 for the reagent to fill and be in intimate contact with the substrate 204 to stain the cells. The reagent is pumped in through the reagent port 106 (i.e., inlet port) on the substrate cartridge 100 until the cavity is filled or partially filled, using a dedicated peri pump per reagent. The reagent is held in place for the time specified in the protocol, then automatically removed by the waste system. The single direction reagent flow and substrate cartridge 100 prevent cross contamination from one substrate 204 to another.

Figure 15:
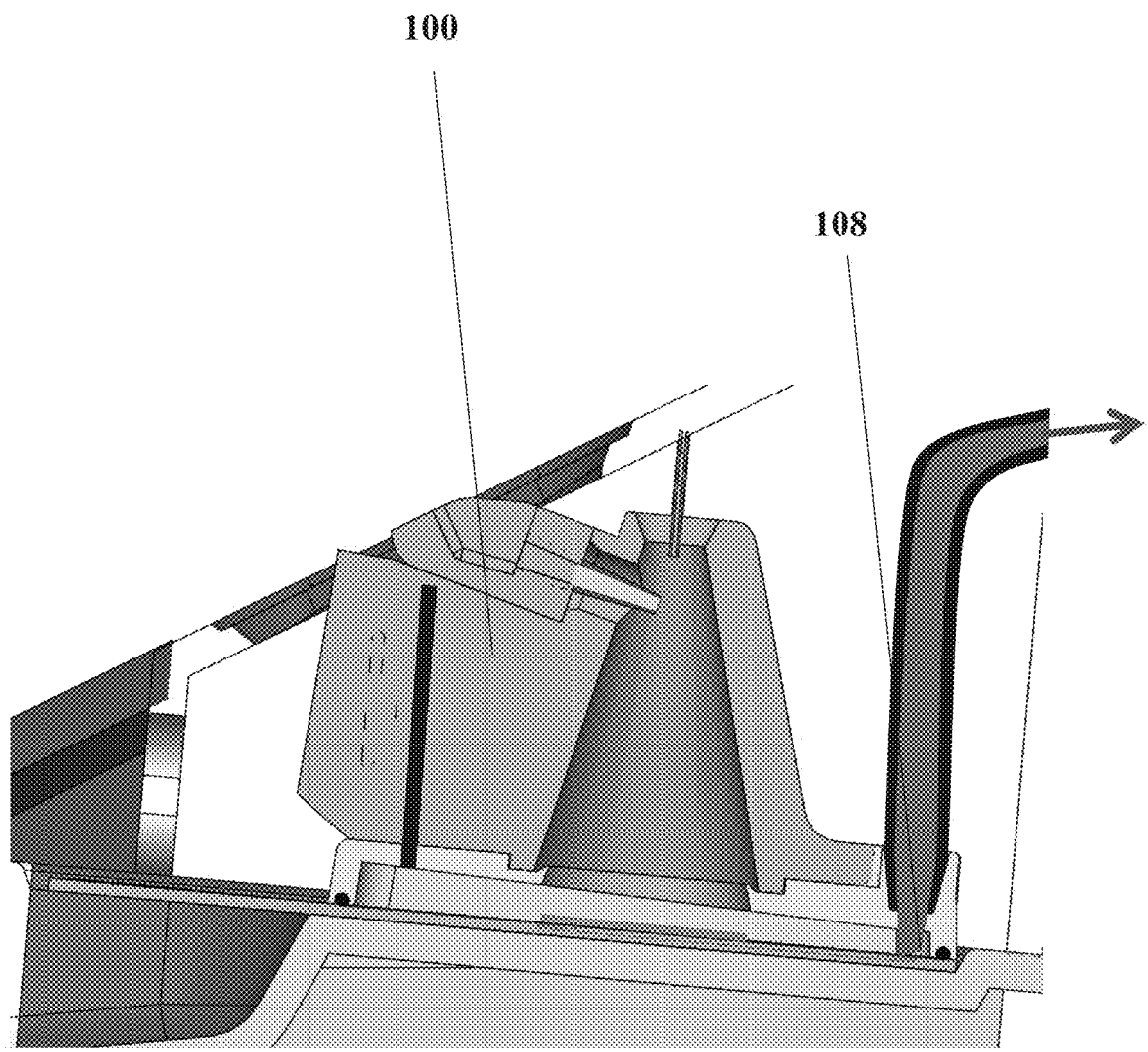
FIG. 15 is a perspective view of a substrate cartridge demonstrating waste removal in accordance with an embodiment of the present disclosure.

FIG. 15 is a perspective view of a substrate cartridge 100 showing removal of reagent through the waste port 108 of the substrate cartridge 100 in accordance with an embodiment of the present disclosure. In some embodiments, the waste is removed from the staining and deposition reservoir 206 via a dedicated peri pump, through the waste port 108 on the substrate cartridge 100.

The speed of the pump is controlled to ensure complete removal of the fluid form the slide, and the pump can be reversed to provide additional agitation.

Figure 16:
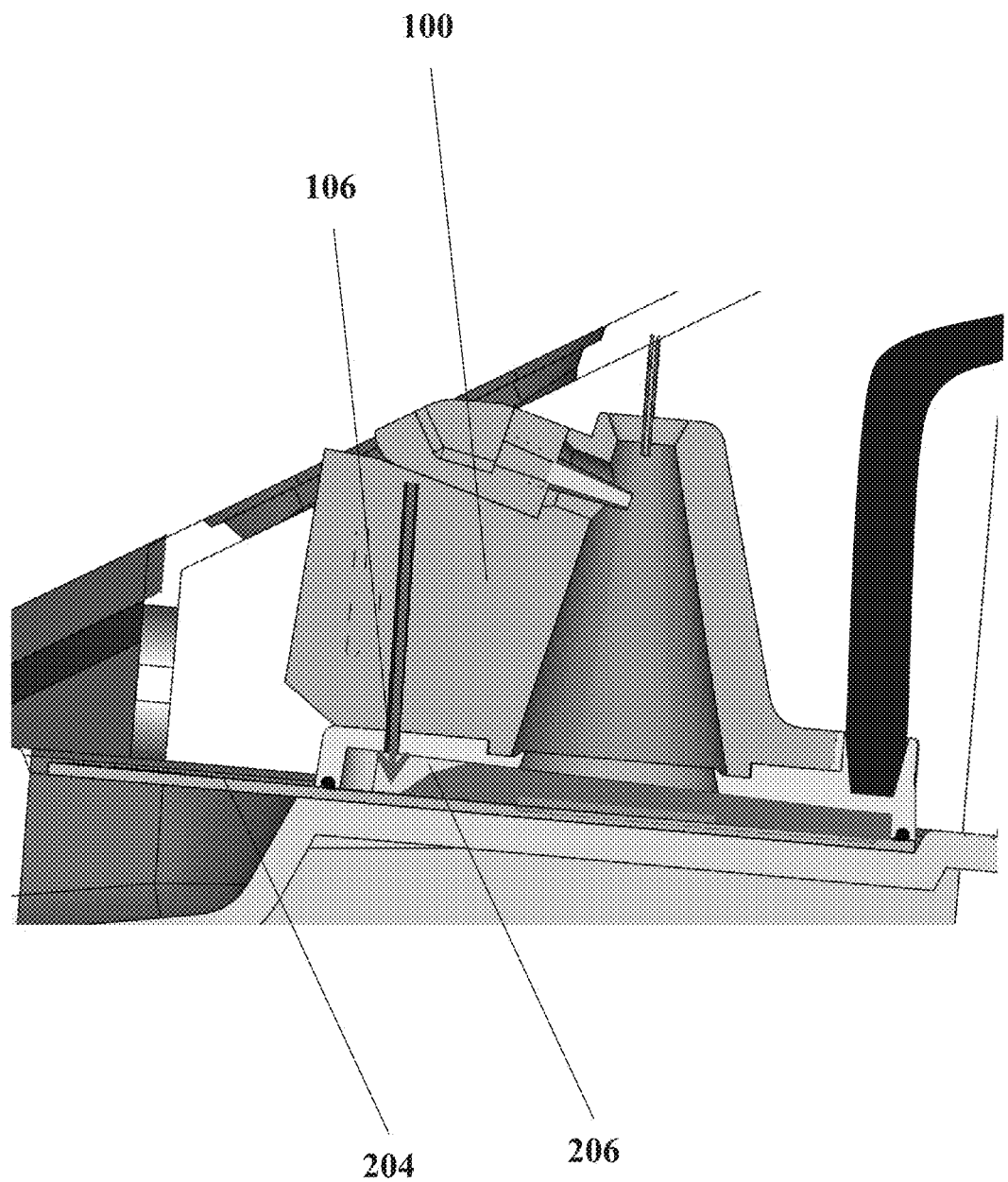
FIG. 16 is a perspective view of a substrate cartridge demonstrating sample staining with a reagent in accordance with an embodiment of the present disclosure.
Figure 17:
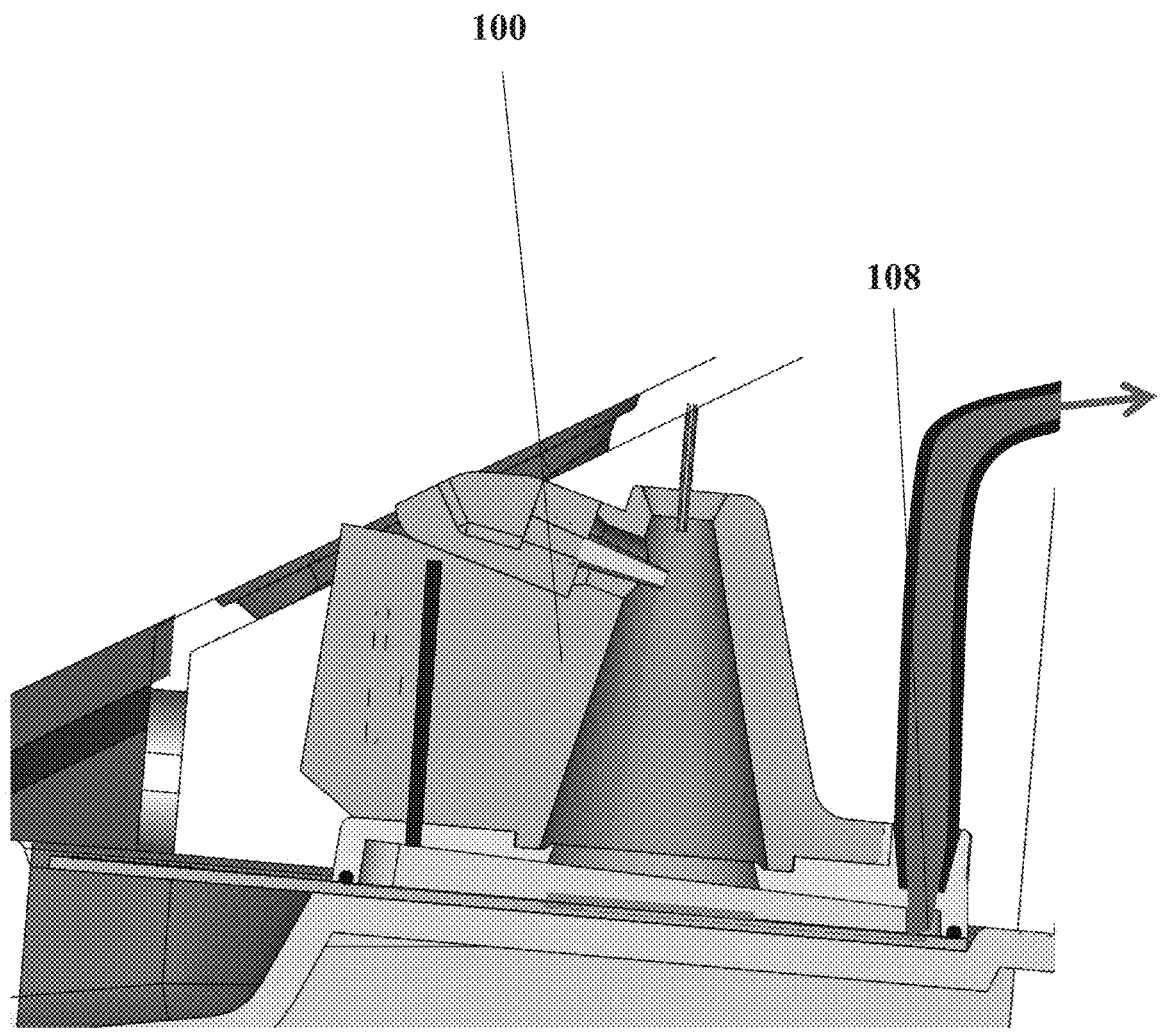
FIG. 17 is a perspective view of a substrate cartridge demonstrating waste removal in accordance with an embodiment of the present disclosure.
Figure 18:
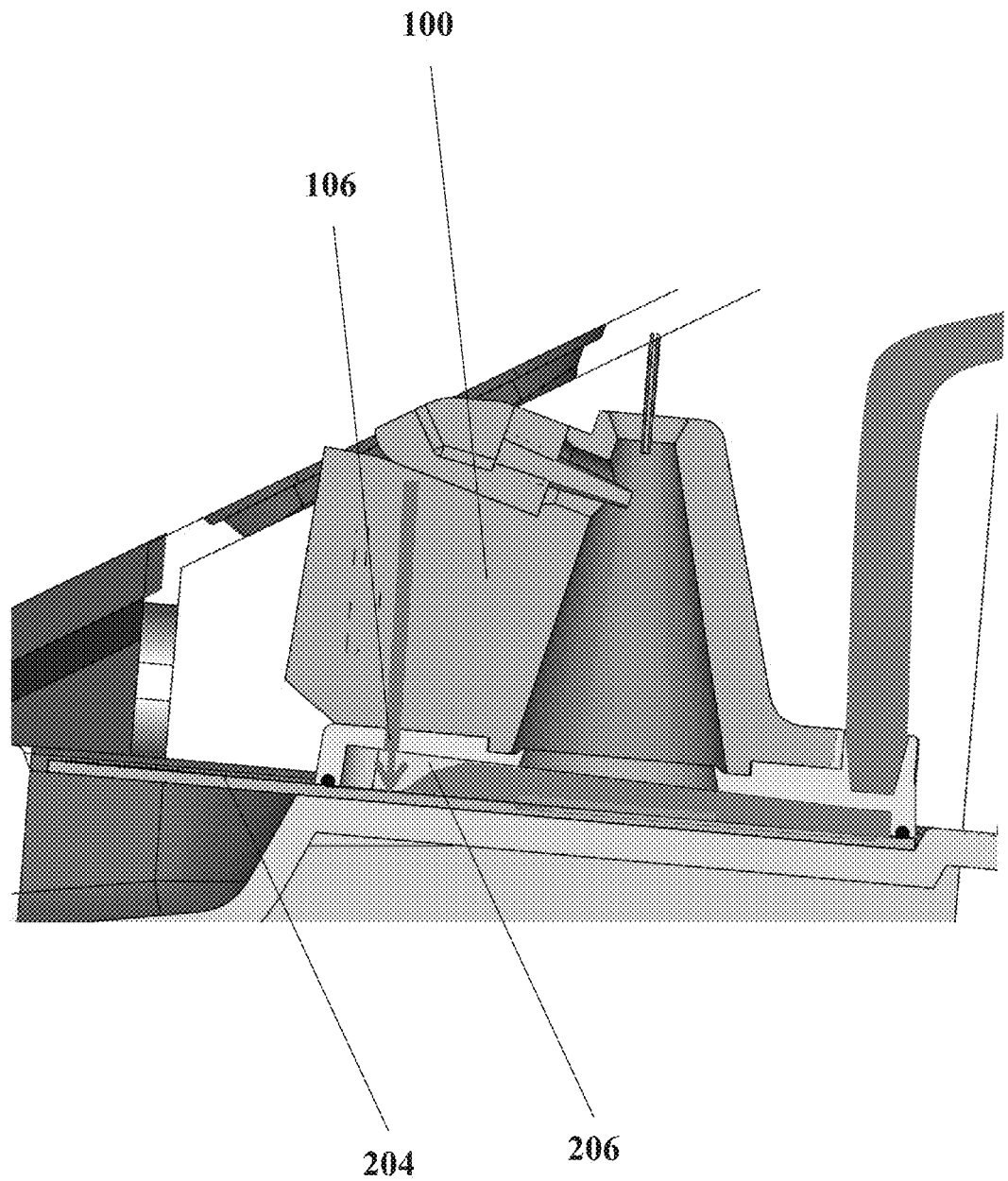
FIG. 18 is a perspective view of a substrate cartridge demonstrating sample wasting with a reagent in accordance with an embodiment of the present disclosure.
Figure 19:
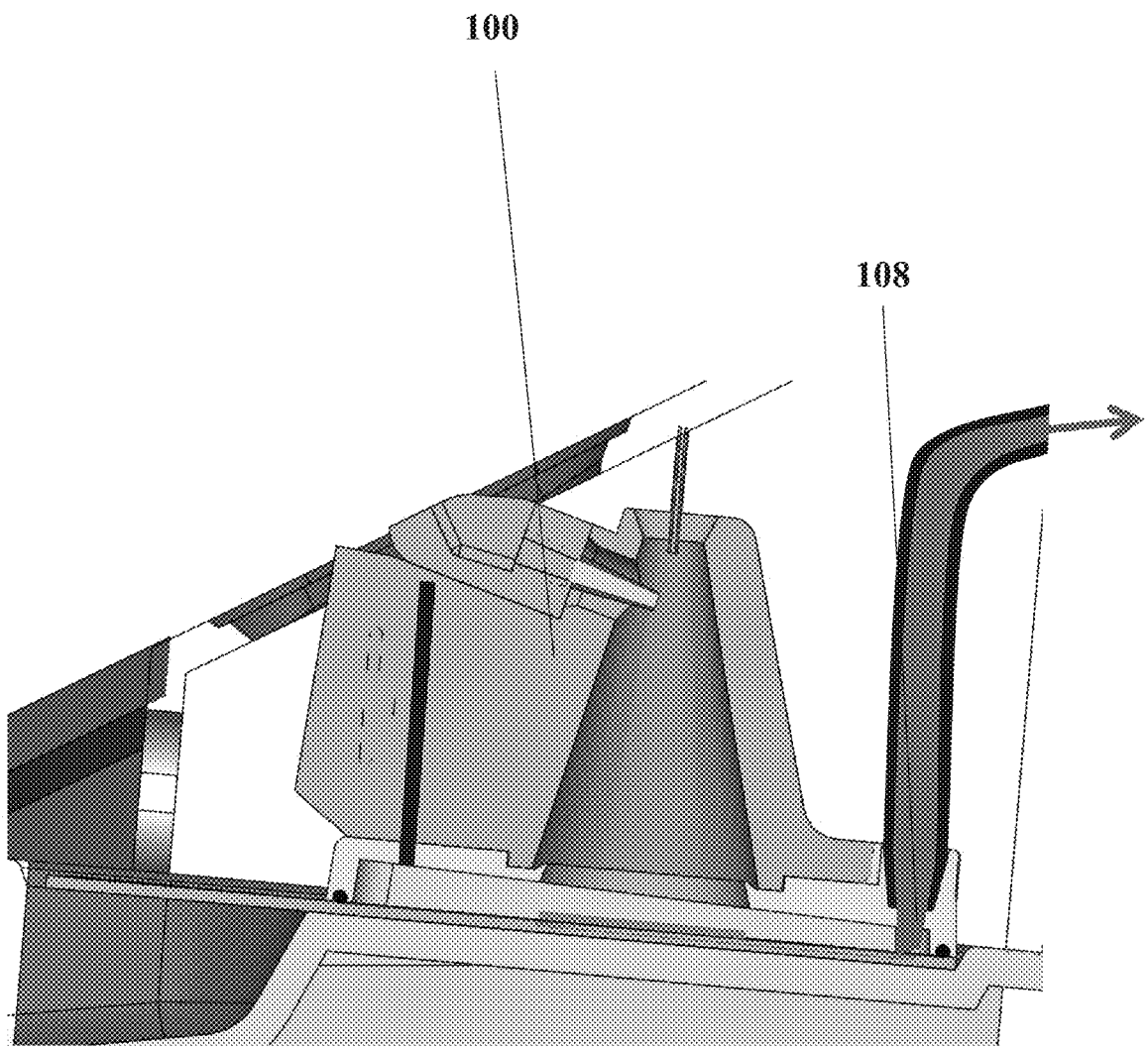
FIG. 19 is a perspective view of a substrate cartridge demonstrating waste removal in accordance with an embodiment of the present disclosure.

FIG. 16 is a perspective view of a substrate cartridge 100 showing a reagent (e.g., a second reagent) being dispensed through a reagent port 106 and into the staining and deposition reservoir 206 created by the substrate cartridge 100 and substrate 204 in accordance with an embodiment of the present disclosure. The reagent is dispensed and covers, or at least partially covers, the cellular sample. In some embodiments, a delay in the programmed module at this step allows the reagent to remain on the cellular sample for a pre-determined amount of time to allow the reagent to penetrate the cellular sample. FIG. 17 is a perspective view of a substrate cartridge 100 showing removal of reagent through the waste port 108 of the substrate cartridge 100 in accordance with an embodiment of the present disclosure. FIG. 18 is a perspective view of a substrate cartridge 100 showing a wash reagent (e.g., water) being dispensed through a reagent port 106 and into the staining and deposition reservoir 206 created by the substrate cartridge 100 and substrate 204 in accordance with an embodiment of the present disclosure. FIG. 19 is a perspective view of a substrate cartridge 100 demonstrating waste removal through the waste port 108 of the substrate cartridge 100 in accordance with an embodiment of the present disclosure.

Figure 20:
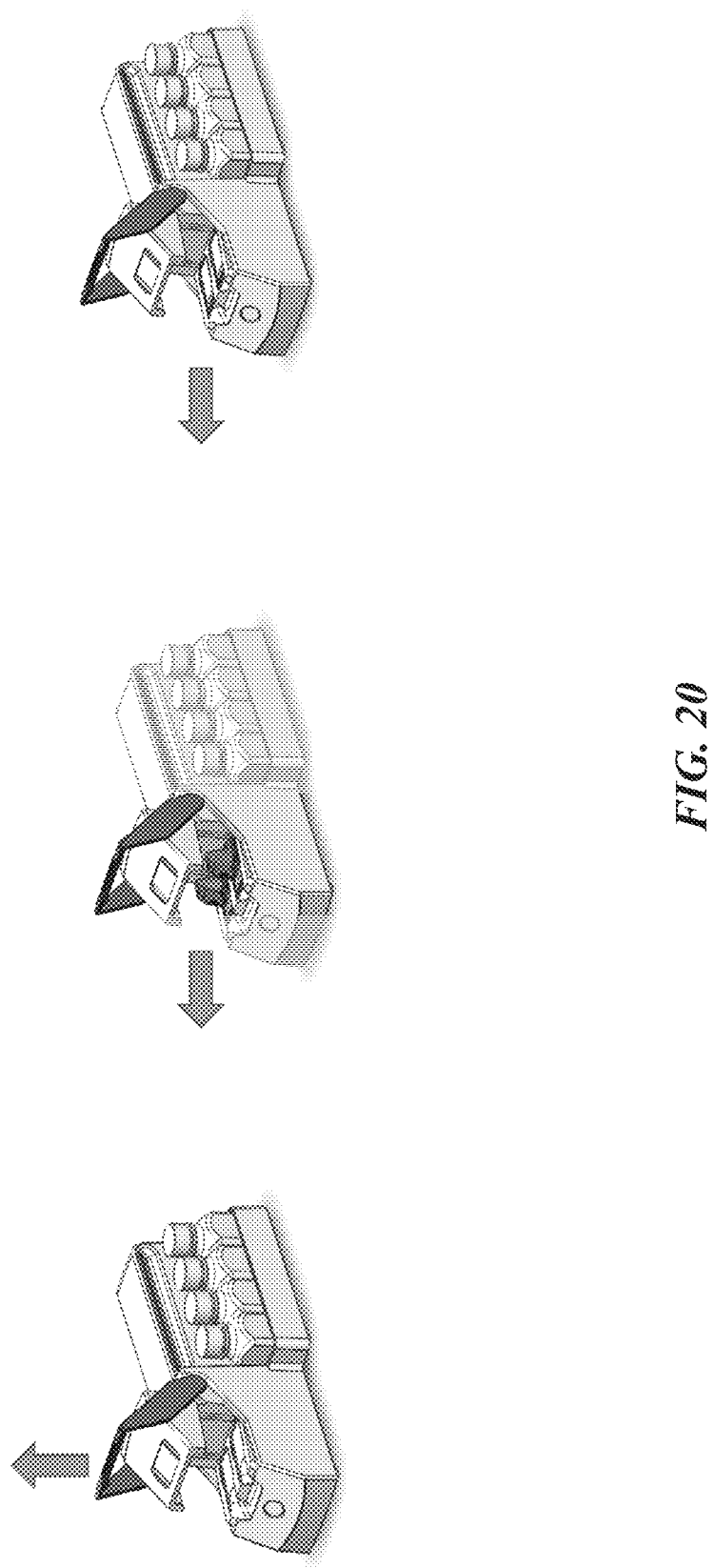
FIG. 20 is a schematic diagram for operating a cellular deposition and staining apparatus in accordance with an embodiment of the present disclosure.
Figure 21:
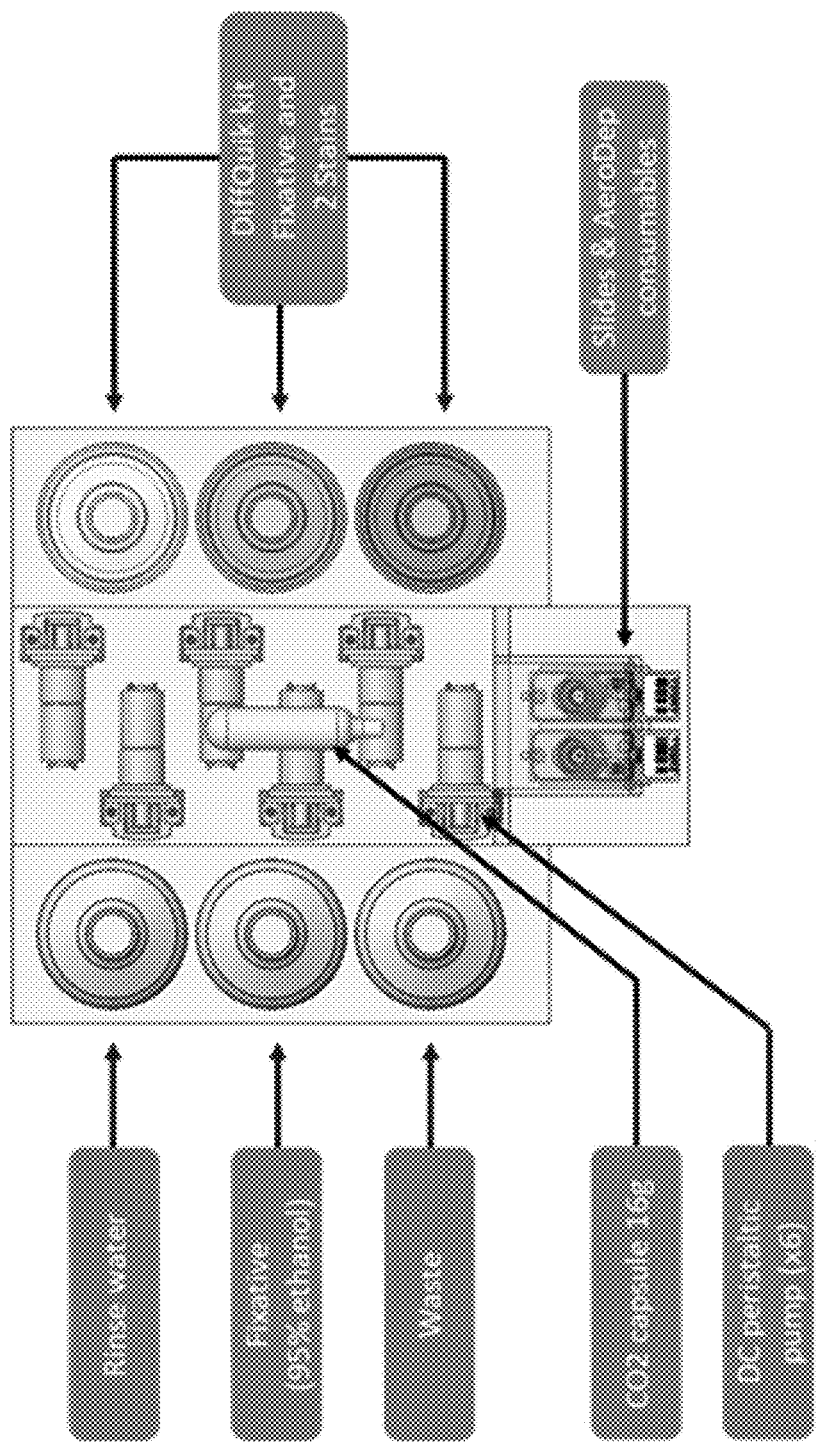
FIG. 21 is a schematic representation of a top view of the inside of a cellular deposition and staining apparatus in accordance with an embodiment of the present disclosure. As shown, there are multiple bottles to contain reagents, a large waste bottle and a pressurized $CO_2$ canister to provide a pressurized air source on board. A dedicated pump per bottle provides metered dispense of the reagents and removal of waste.
Figures 22A, 22B, 22C:
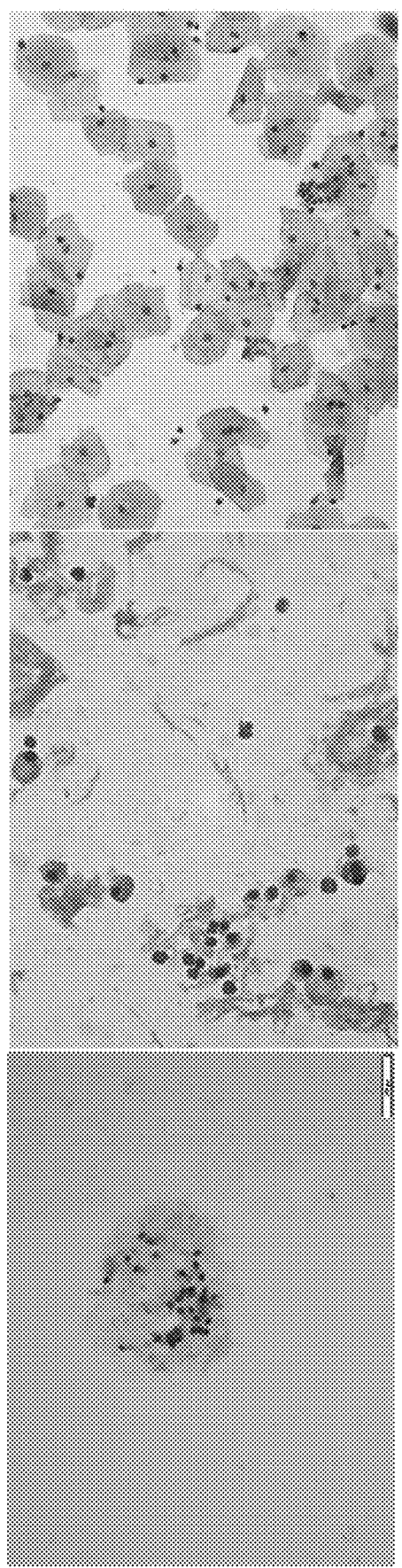
FIGS. 22A-C are representative images of cells obtained from (a) thyroid fine needle aspiration (FNA), (b) pleural effusion and (c) cervical brushings that were fixed using PreservCyt solution. Samples were deposited and stained using a cellular deposition and staining apparatus in accordance with embodiments of the present disclosure.
Figure 23A:
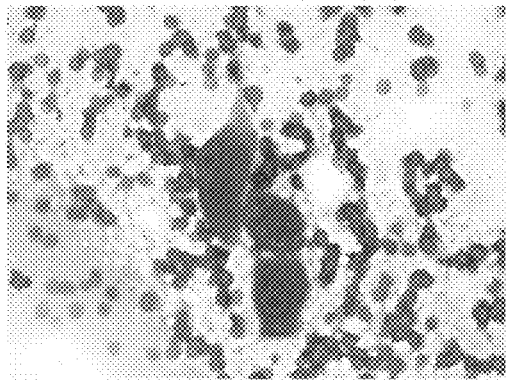
FIGS. 23A-D are representative images of hepatocellular carcinoma cells that were subcutaneously grown on an Oncopig model. FNAs were performed on these subcutaneous tumors using (a) 25-gauge, (b) 22-gauge, (c) 19-gauge, and (d) 18-gauge needles. Samples collected from the FNA procedure were deposited and stained using a cellular deposition and staining apparatus in accordance with embodiments of the present disclosure.
Figure 23B:
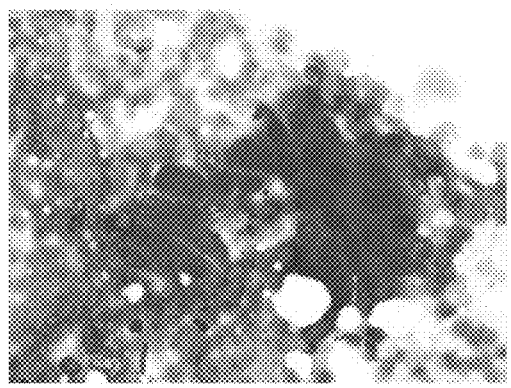
Figure 23C:
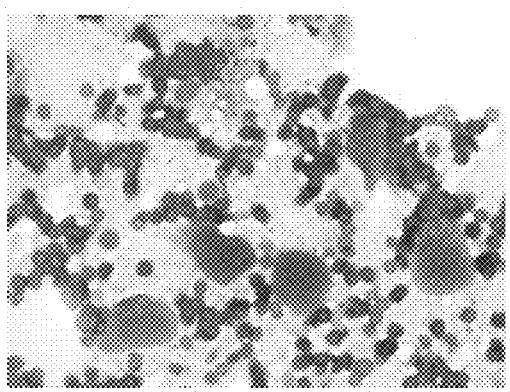
Figure 23D:
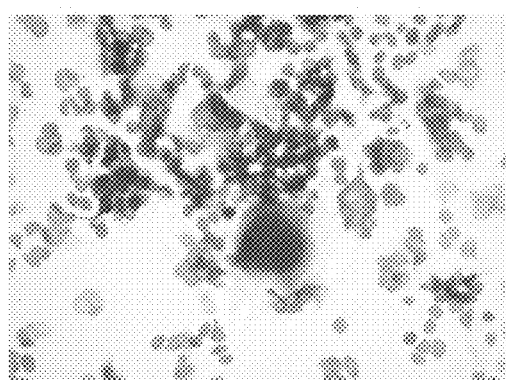
Figures 24A, 24B:
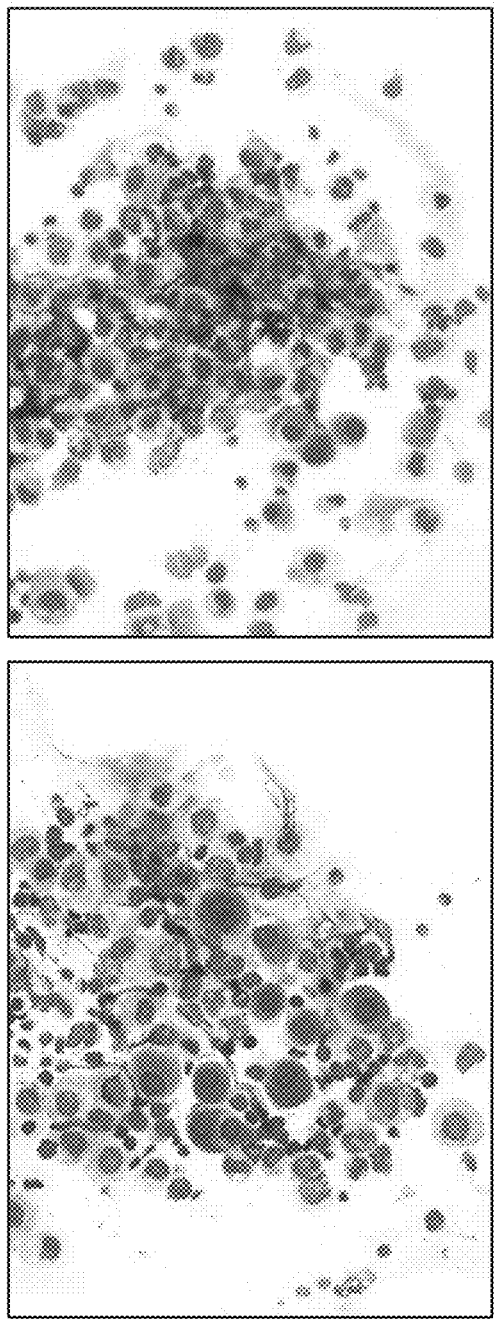
FIGS. 24A-B are representative images of unfixed pleural effusion samples that were deposited and stained using Diff-Quik®. Samples were deposited and stained using a cellular deposition and staining apparatus in accordance with embodiments of the present disclosure.
Figure 25:
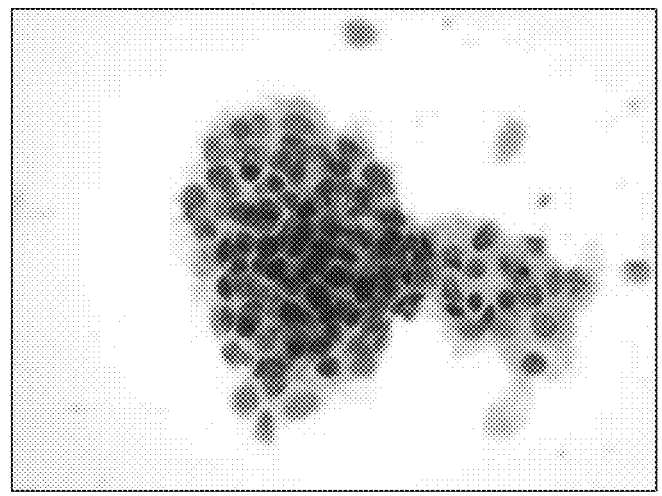
FIG. 25 is a representative image of lung epithelial cells that were obtained after an FNA procedure of a resected lung and prepared using a cellular deposition and staining apparatus in accordance with an embodiment of the present disclosure.

FIG. 20 is a schematic diagram for operating a cellular deposition and staining apparatus in accordance with an embodiment of the present disclosure. Steps shown include lifting a handle, removing and discarding the used substrate cartridges, and removing the stained substrates from the apparatus. The stained substrates can then be analyzed immediately or after a period of time.

The substrates 100 containing the stained cellular material can be analyzed by any suitable methods known to one of skill in the art. Non-limiting examples of suitable analysis methods include microscopy, mass spectrometric methods, visual inspection, fluorescent visualization, microanalyses, imaging (e.g., digital imaging), or other analytical or imaging methods. For example, substrates 100 containing the stained cellular material can undergo further processing including staining (e.g., H & E staining), antigen retrieval, or other types of protocols (e.g., immunohistochemistry, in situ hybridization, etc.). In some embodiments, the substrates 100 containing the stained cellular material generated in accordance with the present disclosure are suitable for use for acquisition of partial wave spectroscopic (PWS) microscopic images and clinical, diagnostic, and research applications thereof. Examples of PWS apparatuses, systems, and methods of use thereof are described, for example, in U.S. Pat. Nos. 7,667,832; 7,800,746; 7,652,772; 8,131,348; 8,735,075; U.S. Pat. App. Pub. No. 2006/0155178; and U.S. Pat. App. Pub. No. 2018/0127833 herein incorporated by reference in their entireties. In some embodiments, the apparatus further comprises a microscope for visualizing and analyzing the cells. In some embodiments, the microscope is a robotic microscope.

In some embodiments, one or more of the components of a deposition and staining apparatus 500 are under the control of one or more electronic controllers or computer processors. In certain embodiments, components and processes that enhance cellular sample deposition and enable automation and/or high-throughput capacity are controlled by a processor. In some embodiments, a processor controls numerous component of a deposition and staining apparatus 500 and coordinates their actions to achieve the desired/directed function. For example, in some embodiments, movement of one or more (e.g., all) of the drive mechanisms and/or motors is automated. In other embodiments, movement is controlled and/or directed by a processor within or in communication with the apparatus 500. In some embodiments, movement is synchronized with other actions of the apparatus 500. In some embodiments, coupling and/or synchronization of steps enhances the automation and speed of the process of obtaining high-quality substrates 204 bearing cellular samples.

For clinical, diagnostic and research applications, high sample quality is desirable for deriving useful and accurate data from the samples. The apparatus 500 and methods described herein facilitate generation of high-quality and reproducible substrates containing cellular samples. For example, the apparatus 500 can be configured to both mix (or similar technique such as agitate, vortex, shake, etc.) the sample as well as count or determine cell concentration of each sample. Each collected cellular sample may have a different quantity of cells thereby introducing variation between samples. In order to standardize the number of cells deposited onto a substrate 204, each sample can be quantified and the apparatus 500 can adjust deposition parameters based on this information and desired criteria. For example, if a sample is assessed and determined to have 10,000 cells per mL of sample and the desired concentration of cells on the substrate is about 1,000 cells per square centimeter over a 1 square-centimeter area, then the system would deposit approximately 1/10 (or 100 microliters). In another example, a second cellular sample is determined to have about 5,000 cells per mL of sample. In this example, and given the same desired concentration of cells on the substrate 204, the apparatus 500 would deposit approximately 1/5 (or 200 microliters). As cellular samples are expected to have variation in the quantity of cells present in the sample retention zone 201, it may be desirable to adjust parameters, such as spray volume, which will govern the quantity of cells deposited onto a substrate (e.g., per-spray volume, total-volume sprayed). Additional adjustments to spray volume may be made based on cell type(s) within the cellular sample. For example, for samples containing large cells, the desired concentration of cells on the substrate maybe lowered.

In some embodiments, the apparatus disclosed and described herein can be used to deposit and stain a cellular sample in less time than conventional methods, including for example, BD PrepStain Slide Processor, Hologic ThinPrep, and Themofisher CytoSpin. In some embodiments, the apparatus disclosed and described herein can prepare a cellular sample in less than about 1 minute, less than about 2 minutes, about 5 minutes, about 10 minutes, about 15 minutes, about 20 minutes, about 25 minutes, about 30 minutes, about 35 minutes, about 40 minutes, about 45 minutes, about 50 minutes, about 55 minutes, or less than 60 minutes. In some embodiments, the apparatus disclosed and described herein can prepare a cellular sample in less than about 1 minute.

In one embodiment, electrical impedance can be used for determining cell concentration within the sample. For example, as the cells are pumped through a chamber, the impedance changes which may be correlated to cell quantity in the tested sample. An alternative approach for determining cell concentration within the sample would include the use of a laser and sensor to detect changes in intensity due to the presence of shadows (e.g., as detected by an optical sensor). As intensity changes, voltage will vary, accurately assessing cell counts per volume.

EXAMPLES

Example 1

Cell Collection and Spray Deposition

The quality and reproducibility of spray deposition of different cellular samples on microscope slides, in accordance with aspects of the present disclosure was verified by performing experiments on collected thyroid FNA, pleural effusion, and cervical brushings. Cells were harvested and deposited and staining using the apparatus disclosed and described herein.

FIGS. 22A-22C are 20× images of thyroid FNA (a), pleural effusion (b), and cervical brushings (c) that were fixed using ThinPrep PerservCyt solution. As shown in FIGS. 22A-22B, the cells are isolated, undamaged, not folded and round. Accordingly, this data shows that the apparatus of the present disclosure provides cells that are of high quality and suitable for analysis.

FIGS. 23A-23D are 20× images of hepatocellular carcinoma cells that were subcutaneously grown on an Oncopig model. FNAs were performed on these subcutaneous tumors using (a) 25-gauge, (b) 22-gauge, (c) 19-gauge, and (d) 18-gauge needles. The specimen collected from the FNA procedure were deposited using the apparatus of the present disclosure. These data indicate that adequate number of hepatocellular carcinoma tumor cells were present to make a diagnosis in the specimen substrates collected using 25-, 22-, and 19-gauge needles that were prepared using the apparatus of the present disclosure. However, cells collected with the 18-gauge needles clogged the system while attempting to spray the 18-gauge needle material, so only limited cellular material was released onto the slide.

FIGS. 24A-24B are 20× images of unfixed pleural effusion samples that were deposited and Diff-Quik® stained using the apparatus of the present disclosure. The quality of the specimen slide prepared using the apparatus of the present disclosure is comparable to the current available techniques. FIG. 25 is a 20× image of unfixed lung epithelial cells that were obtained by performing FNA on resected lung tumor. The FNA samples were deposited and Diff-Quik® stained using the apparatus of the present disclosure. The quality of this specimen slide is considered to be similar or better than the current available techniques.

A study was performed to compare the performance of the apparatus of the present disclosure with currently available commercial systems to evaluate: (a) concordance in diagnosis; (b) stain quality; and (c) cellularity of samples. The performance summary of the test is provided in the table below.

| Cell/Specimen Quality | Performance |
|---|---|
| Concordance in diagnosis | 100% (20/20) |
| Stain quality | 100% (20/20) |
| Cellularity | 85% (17/20) |

These results were obtained from a blinded study on 20 patient samples comparing the performance of the apparatus of the present disclosure with the currently available commercial systems. The results indicate that there is a 100% concordance in diagnosis and stain quality. The reason for low concordance in cellularity is due to the difference in storage time (1 day for commercial system vs 8 days for specimen preparation system) between both the apparatuses.

The above detailed descriptions of embodiments of the technology are not intended to be exhaustive or to limit the technology to the precise form disclosed above. Although specific embodiments of, and examples for, the technology are described above for illustrative purposes, various equivalent modifications are possible within the scope of the technology, as those skilled in the relevant art will recognize. The various embodiments described herein may also be combined to provide further embodiments.

From the foregoing, it will be appreciated that specific embodiments of the technology have been described herein for purposes of illustration, but well-known structures and functions have not been shown or described in detail to avoid unnecessarily obscuring the description of the embodiments of the technology. Where the context permits, singular or plural terms may also include the plural or singular term, respectively.

Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Additionally, the term "comprising" is used throughout to mean including at least the recited feature(s) such that any greater number of the same feature and/or additional types of other features are not precluded. It will also be appreciated that specific embodiments have been described herein for purposes of illustration, but that various modifications may be made without deviating from the technology. Further, while advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

What is claimed is:

1. An apparatus for depositing and staining a cellular sample, comprising:
   a housing having an access door;
   a substrate processing holder located within the housing configured to hold a substrate and a substrate cartridge, wherein the substrate processing holder is accessible when the access door is in an open configuration;
   a user interface configured receive an input from a user, and in response to receiving the input, cause execution of a pre-programmed protocol; and
   a waste and stain holder element configured to hold at least one waste bottle and at least one reagent vessel, wherein the substrate cartridge comprises (a) a first port configured for a deposition of the cellular sample on the substrate and (b) a second port configured for a staining of the cellular sample, and wherein the staining is performed subsequent to the deposition.

2. The apparatus of claim 1, further comprising:
   a spray nozzle configured to dispense an aerosolized cellular sample into a substrate processing area comprising the substrate and the substrate cartridge.

3. The apparatus of claim 2, wherein the first port comprises (i) a first end for receiving the cellular sample, (ii) a second end for releasing the cellular sample into a spray retainer of the substrate cartridge, and (iii) a sample retention zone located between the first end and the second end, wherein the substrate cartridge further comprises an upper opening configured to receive the spray nozzle, and wherein the upper opening is positioned at an angle to an opening at the second end of the first port.

4. The apparatus of claim 3, wherein the spray retainer has a rectangular prismatic, cylindrical, or frusto-conical shape.

5. The apparatus of claim 2, wherein a distance between the spray nozzle and a surface of the substrate is based on a cell size and/or cell shape in the cellular sample.

6. The apparatus of claim 2, wherein the deposition of the cellular sample on the substrate yields a uniform layer of non-overlapping cells of the cellular sample.

7. The apparatus of claim 6, wherein the deposition of the uniform layer of non-overlapping cells of the cellular sample on the substrate is based on a design of the spray nozzle and a distance between the spray nozzle and a surface of the substrate.

8. The apparatus of claim 1, further comprising an environmental chamber configured to control humidity levels inside the apparatus.

9. The apparatus of claim 1, further comprising a heating element configured to dry, subsequent to the staining, the cellular sample on the substrate.

10. The apparatus of claim 9, wherein drying of the cellular sample is monitored using an optical sensor.

11. The apparatus of claim 1, wherein the staining of the cellular sample uses a hematoxylin and eosin (H&E) stain.

12. The apparatus of claim 1, wherein the staining of the cellular sample uses at least two different reagents.

13. The apparatus of claim 1, wherein at least one imaging method is performed, subsequent to the deposition and the staining, on the substrate comprising the cellular sample.

14. The apparatus of claim 13, wherein the at least one imaging method comprises microscopy, a mass spectrometric method, a visual inspection, and/or a fluorescent visualization.

15. The apparatus of claim 1, wherein the cellular sample comprises a cell culture, a sample of human epithelial cells, or a fine-needle aspirate (FNA).

* * * * *